US008493380B2

(12) United States Patent  
Aihara et al.

(10) Patent No.: US 8,493,380 B2  
(45) Date of Patent: Jul. 23, 2013

(54) METHOD AND SYSTEM FOR CONSTRUCTING VIRTUAL SPACE

(75) Inventors: Toru Aihara, Yokohama (JP); Kazutoshi Sugimoto, Machida (JP)

(73) Assignee: International Business Machines Corporation, Armonk, NY (US)

(*) Notice: Subject to any disclaimer, the term of this patent is extended or adjusted under 35 U.S.C. 154(b) by 1019 days.

(21) Appl. No.: 12/275,374

(22) Filed: Nov. 21, 2008

(65) Prior Publication Data

US 2009/0135178 A1   May 28, 2009

(30) Foreign Application Priority Data

Nov. 22, 2007 (JP) .................................. 2007-303392

(51) Int. Cl.
*G06T 15/00* (2011.01)

(52) U.S. Cl.
USPC ........................................................ 345/419

(58) Field of Classification Search
None
See application file for complete search history.

(56) References Cited

U.S. PATENT DOCUMENTS

| | | | |
|---|---|---|---|
| 6,759,979 B2* | 7/2004 | Vashisth et al. | 342/357.31 |
| 7,142,209 B2* | 11/2006 | Uyttendaele et al. | 345/427 |
| 7,734,116 B2* | 6/2010 | Panabaker et al. | 382/284 |
| 2001/0022621 A1* | 9/2001 | Squibbs | 348/232 |
| 2007/0103461 A1* | 5/2007 | Suzuno et al. | 345/419 |
| 2007/0139546 A1* | 6/2007 | Baiping et al. | 348/333.01 |
| 2008/0120306 A1* | 5/2008 | Panabaker et al. | 707/100 |

FOREIGN PATENT DOCUMENTS

| | | |
|---|---|---|
| JP | 07236113 A2 | 9/1995 |
| JP | 09505138 | 5/1997 |
| JP | 11168754 A | 6/1999 |
| JP | 11259672 | 9/1999 |
| JP | 2001-069531 A | 3/2001 |
| JP | 2002092597 | 3/2002 |
| JP | 2003-153253 A | 5/2003 |
| JP | 2004080359 A2 | 3/2004 |
| JP | 2005-277670 A | 10/2005 |
| JP | 2006-220521 A | 8/2006 |
| WO | WO 95/07526 | 3/1995 |

OTHER PUBLICATIONS

Pollefeys, Marc; "Visual Modeling with a Hand-Held Camera;" International Journal of Computer Vision 59(3); Kluwer Academic Publishers, Netherlands; Oct. 2004, pp. 207-232.*

* cited by examiner

*Primary Examiner* — Edward Martello
(74) *Attorney, Agent, or Firm* — Cantor Colburn LLP; Preston Young

(57) ABSTRACT

A method, computer program product and system for constructing a virtual space in which simple, time sequential photographs are taken by one or more image capturing systems, including their positional and other pertinent data which are efficiently stored in an image database system. Based upon selective view points, images and image data are retrieved from the database, processed for visualization referenced to desired viewing positions and conditions and are then displayed in real time in response to user interaction and movement within the virtual space presentation.

18 Claims, 34 Drawing Sheets

FIG. 1
(1)
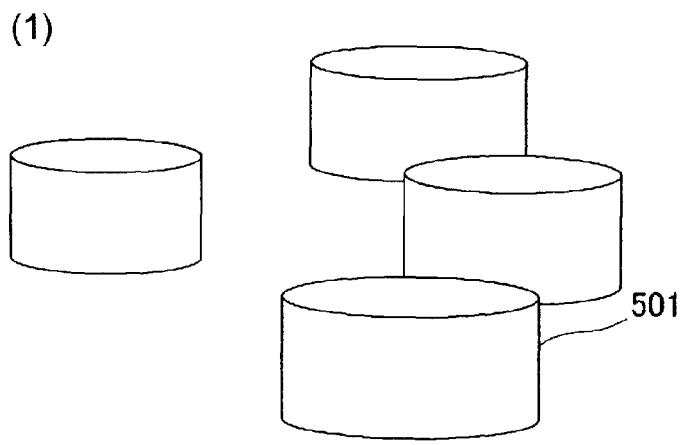
(2) (TOP VIEW)
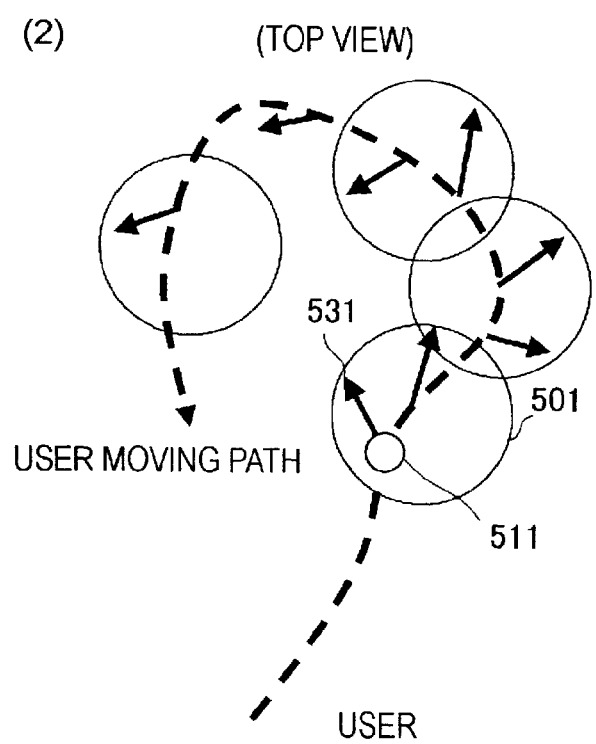
USER MOVING PATH
USER

FIG. 3
(1)
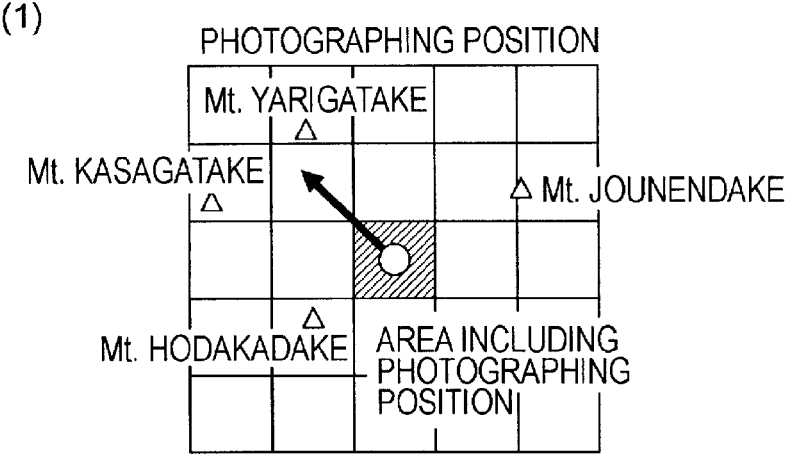
(2)
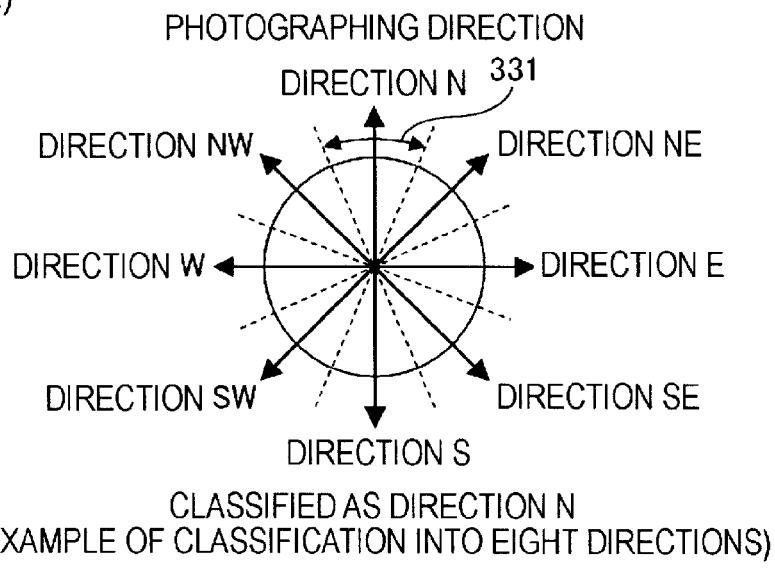
CLASSIFIED AS DIRECTION N
(EXAMPLE OF CLASSIFICATION INTO EIGHT DIRECTIONS)
(3)
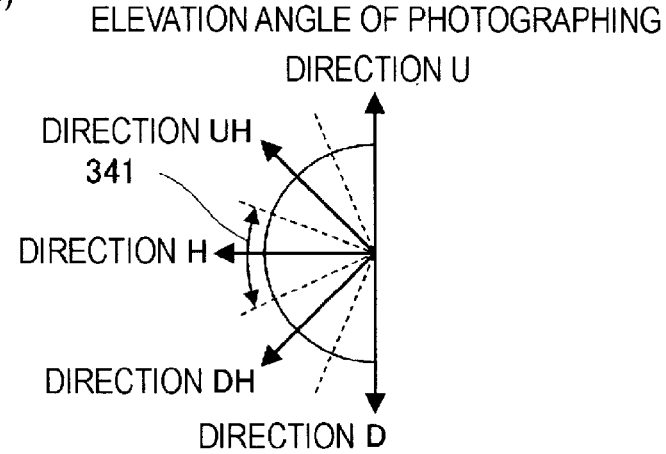

FIG. 4
(1) EXAMPLE OF MANAGING AREA WITH QUADTREE
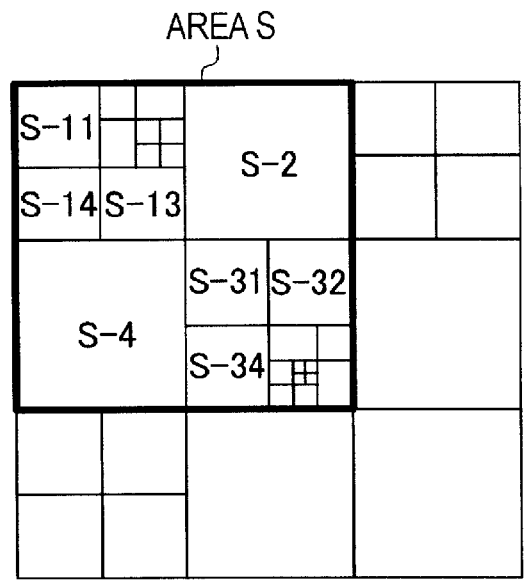
(2) QUADTREE STRUCTURE
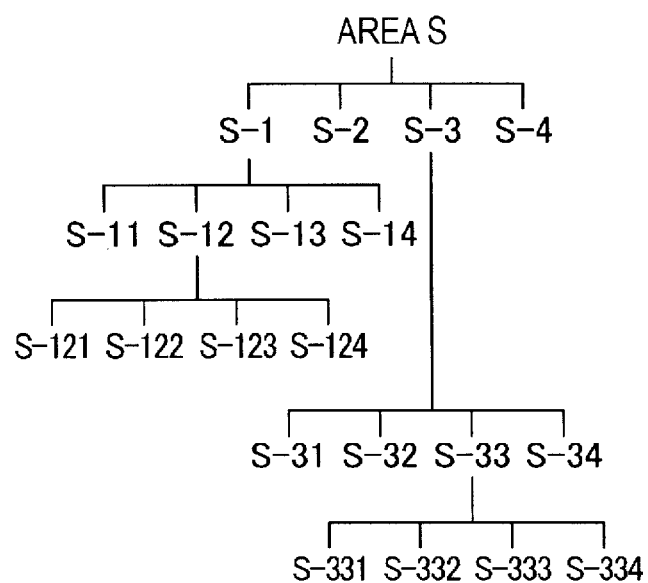

FIG. 5
(1)
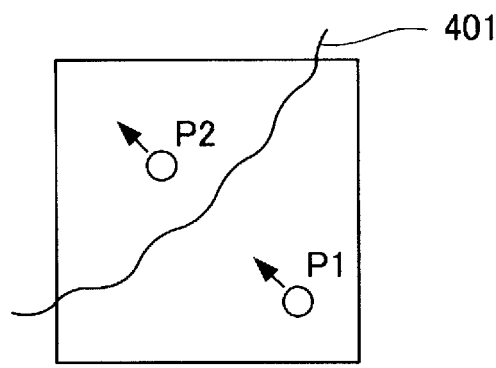
(2)
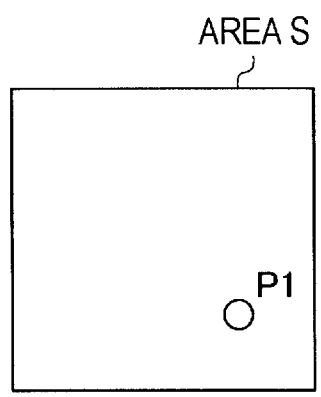
(3)
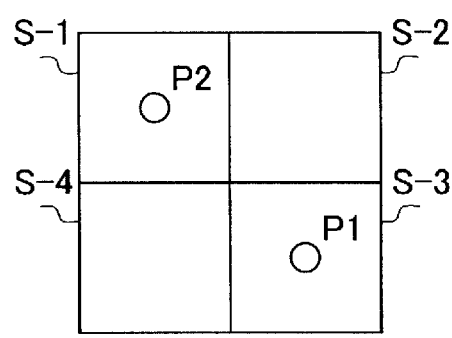

MANAGING AREA FOR EACH PHOTOGRAPHING DIRECTION

QUADTREE OF IMAGE AREA IS CONSTRUCTED
FOR EACH PHOTOGRAPHING DIRECTION. IF THERE
ARE MANY PHOTOGRAPHING DIRECTIONS HAVING
NO IMAGE, DATA VOLUME CAN BE REDUCED.

FIG. 8
VISUALIZED IMAGE DISPLAY SPACE
(1) CYLINDRICAL SHAPE
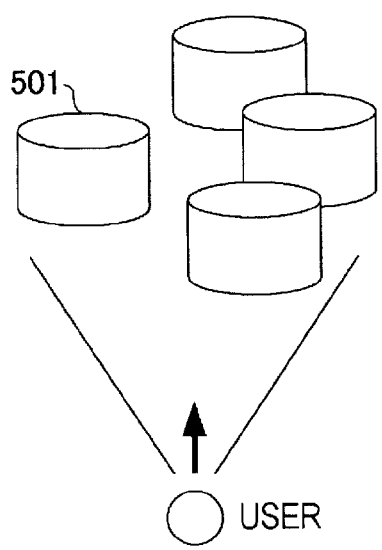
(2) SEMI-SPHERE
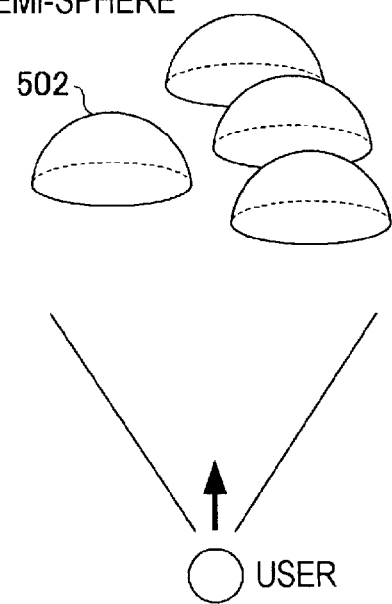
(3) SPHERE
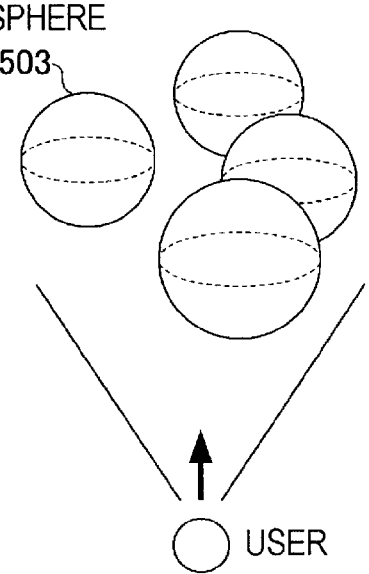
(4) PARTICLE
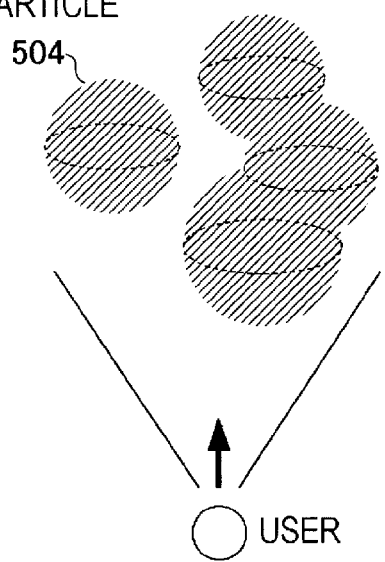

FIG. 10
(1)
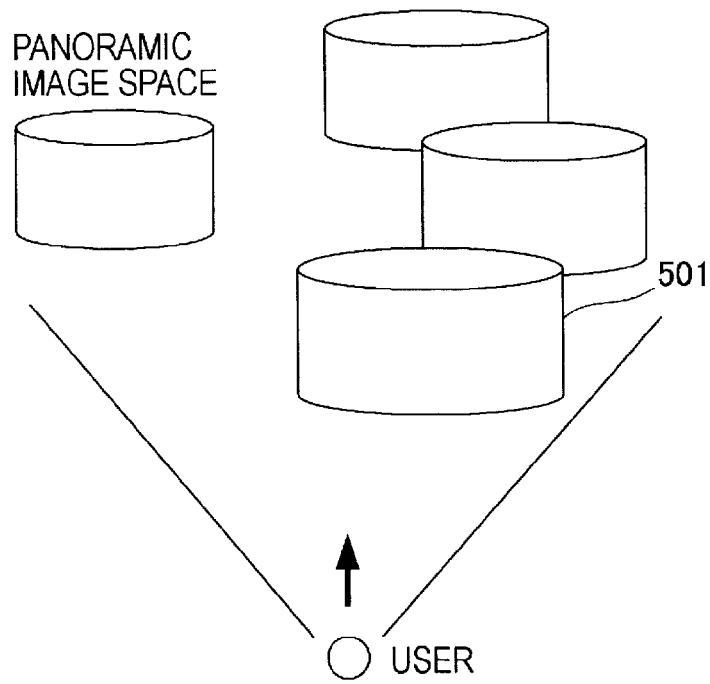
(2)
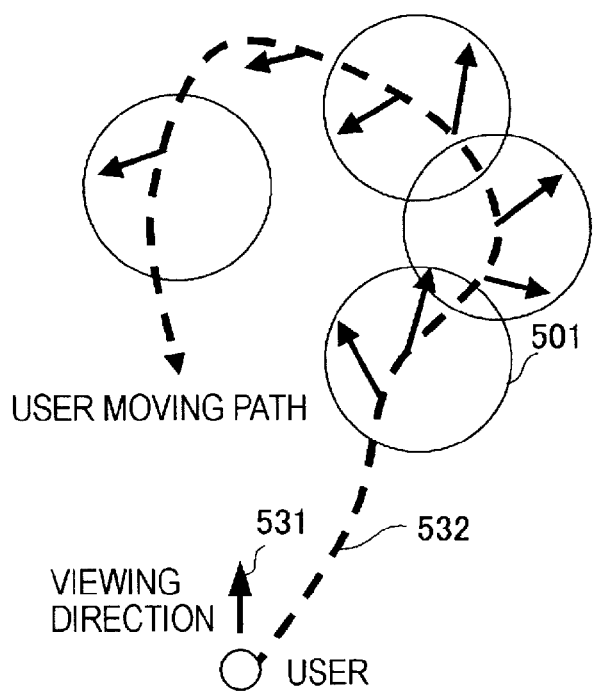

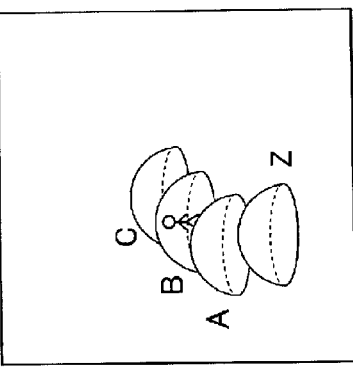
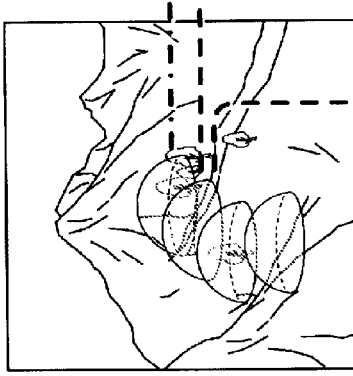
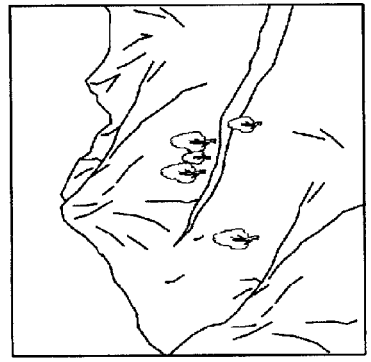
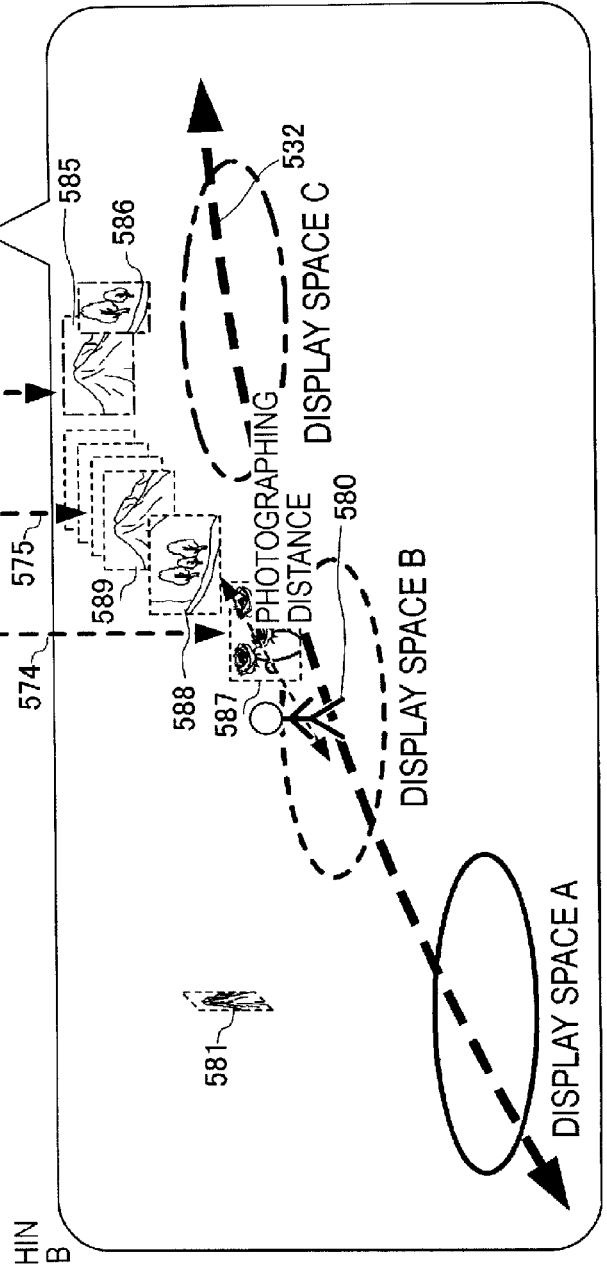
FIG. 14
EXAMPLE (3) OF PANEL DISPLAY ON FOCAL DISTANCE

FIG. 16
VISUALIZATION WHEN ANOTHER DISPLAY
SPACE IS INCLUDED IN DISPLAY SPACE
(1)
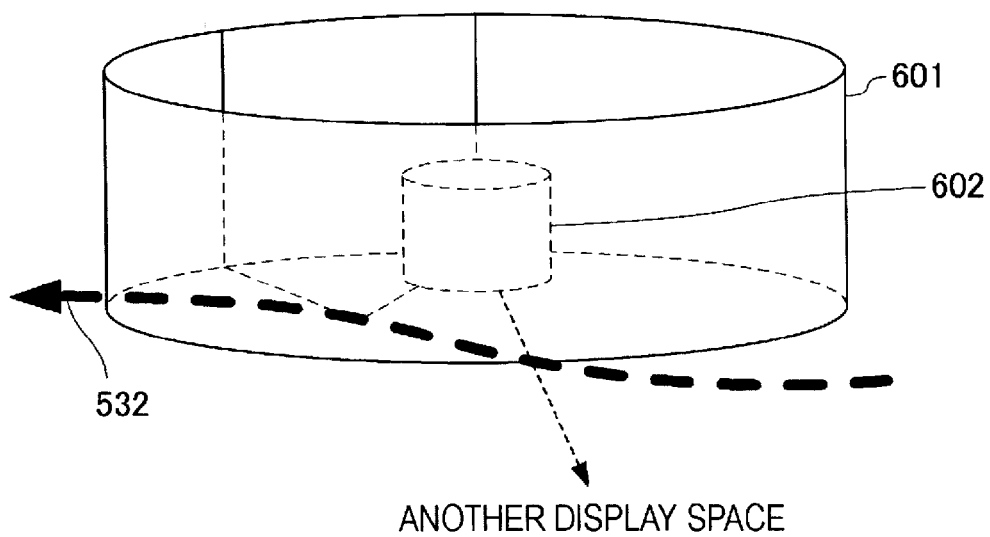
ANOTHER DISPLAY SPACE
(2)
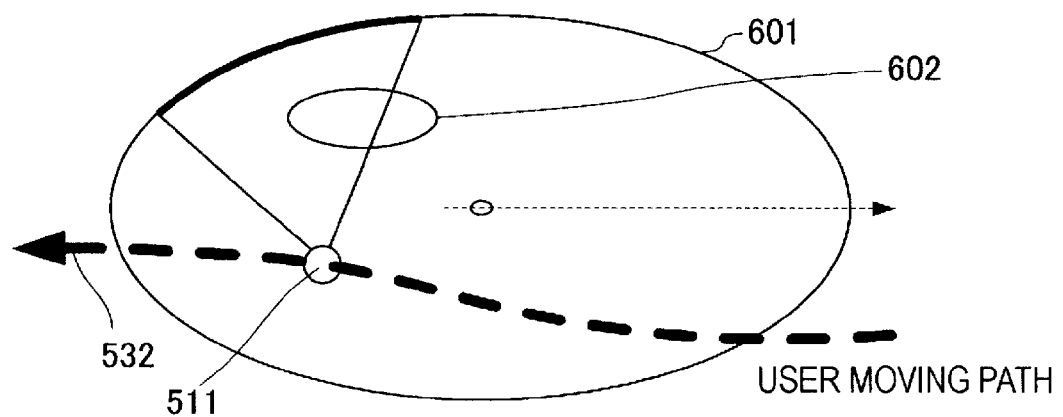
USER MOVING PATH

FIG. 17
VISUALIZATION WHEN IMAGE DISPLAY SPACE IS
COMPLETELY INCLUDED IN ANOTHER DISPLAY SPACE
(1)
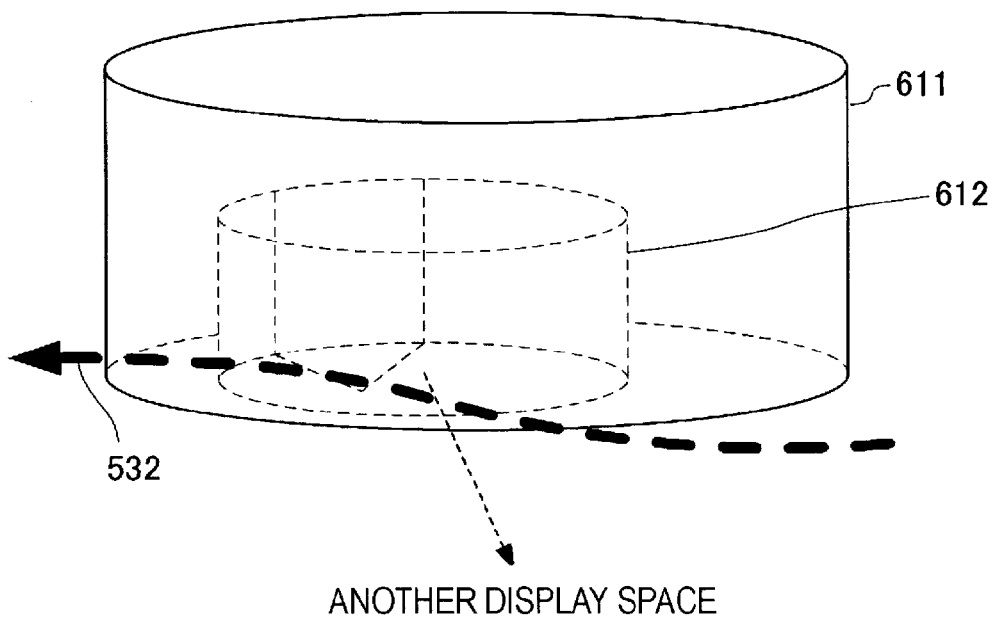
ANOTHER DISPLAY SPACE
(2)
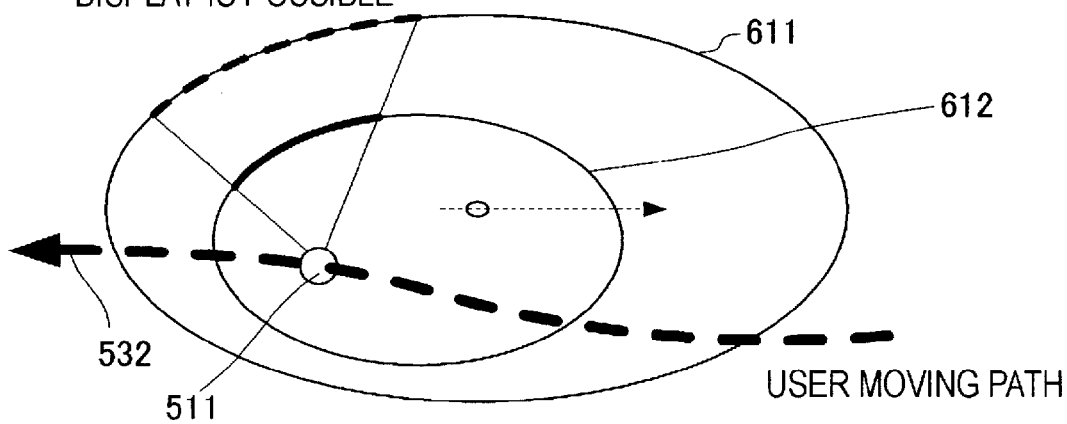
TRANSLUCENT DISPLAY IS POSSIBLE
USER MOVING PATH

FIG. 18
VISUALIZATION WHEN IMAGE DISPLAY SPACES OVERLAP
(1)
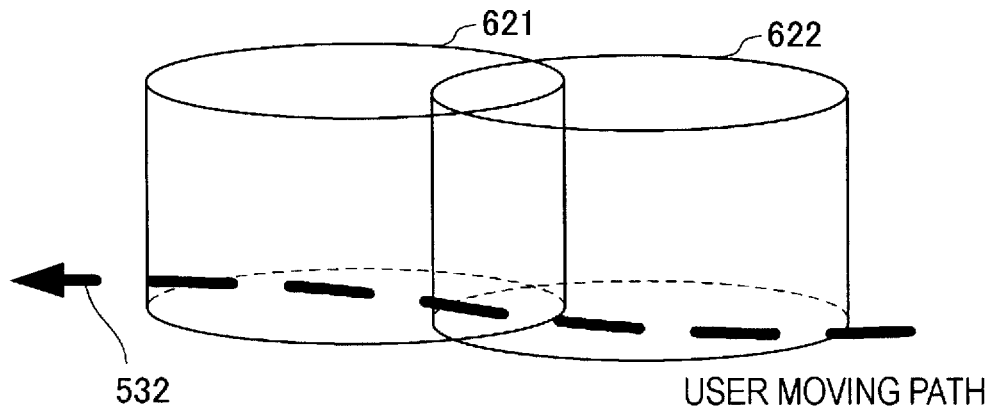
(2)
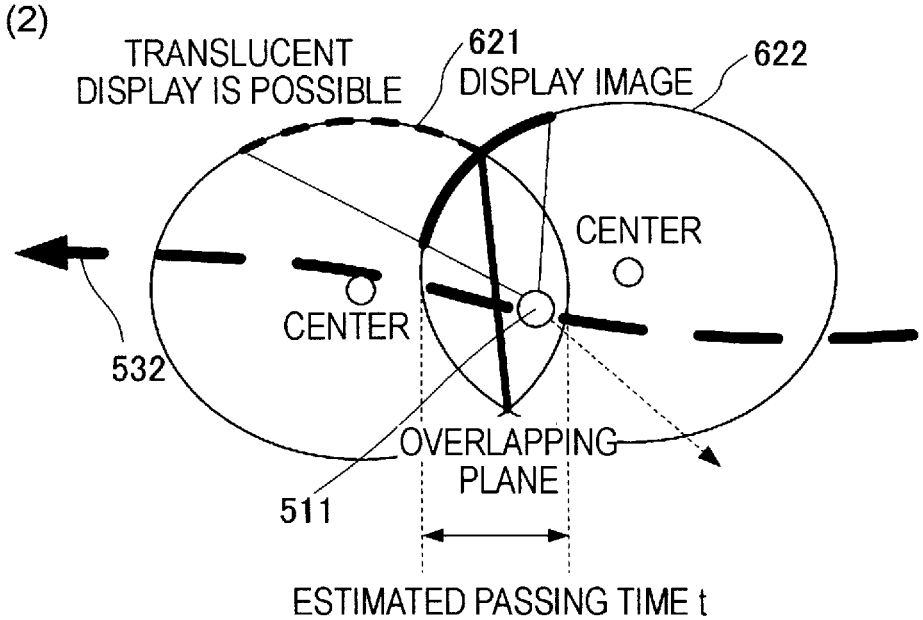

WHEN USER PATH IS a→b→c→d→c→b→c→d→e,
WORLD THAT IS DISPLAYED CHANGES TO
A→A→A→B→B→A→A→B→B.
BUFFER AREA c DISPLAYS IMAGE A OR B OF
PREVIOUS WORLD.

FIG. 20
HYSTERESIS OF FADE-IN AND FADE-OUT
(1)
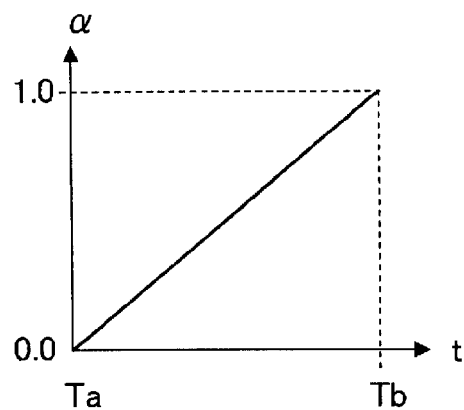
(2)
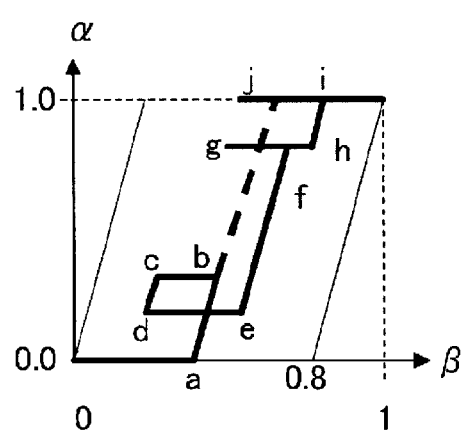
(3) BUFFER AREA
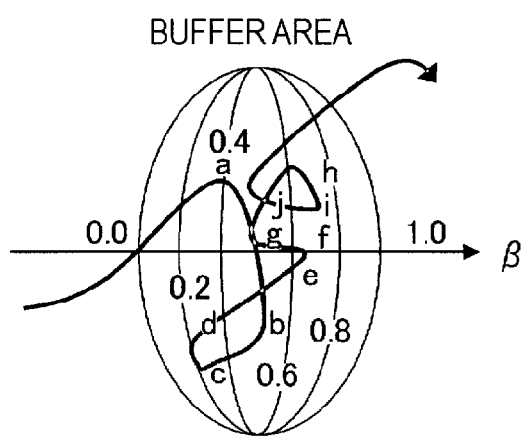

EXAMPLE OF PANORAMIC IMAGE IN DISPLAY SPACE

FIG. 34

(1) EXAMPLE OF SEARCHING ADJACENT AREA (DIVIDED EVENLY)

| 000, 111 | 001, 111 | 010, 111 | 011, 111 | 100, 111 | 101, 111 | 110, 111 | 111, 111 |
|---|---|---|---|---|---|---|---|
| 000, 110 | 001, 110 | 010, 110 | 011, 110 | 100, 110 | 101, 110 | 110, 110 | 111, 110 |
| 000, 101 | 001, 101 | 010, 101 | 011, 101 | 100, 101 | 101, 101 | 110, 101 | 111, 101 |
| 000, 100 | 001, 100 | 010, 100 | 011, 100 | 100, 100 | 101, 100 | 110, 100 | 111, 100 |
| 000, 011 | 001, 011 | 010, 011 | 011, 011 | 100, 011 | 101, 011 | 110, 011 | 111, 011 |
| 000, 010 | 001, 010 | 010, 010 | 011, 010 | 100, 010 | 101, 010 | 110, 010 | 111, 010 |
| 000, 001 | 001, 001 | 010, 001 | 011, 001 | 100, 001 | 101, 001 | 110, 001 | 111, 001 |
| 000, 000 | 001, 000 | 010, 000 | 011, 000 | 100, 000 | 101, 000 | 110, 000 | 111, 000 |

(2) EXAMPLE OF SEARCHING ADJACENT AREA (DIVIDED UNEVENLY)

| 00,11 | 01,11 | | 10,11 | 11,11 |
|---|---|---|---|---|
| 00,10 | 010, 101 | 011, 101 | 10,10 | 11,10 |
| | 010, 100 | 011, 100 | | |
| 000, 011 | 001, 011 | 010, 011 | 011, 011 | 100, 011 | 101, 011 | 110, 011 | 111, 011 |
| 000, 010 | 001, 010 | 010, 010 | 011, 010 | 100, 010 | 101, 010 | 110, 010 | 111, 010 |
| 000, 001 | 001, 001 | 010, 001 | 011, 001 | 100, 001 | 101, 001 | 110, 001 | 111, 001 |
| 000, 000 | 001, 000 | 010, 000 | 011, 000 | 100, 000 | 101, 000 | 110, 000 | 111, 000 |

FIG. 35

(3) SEARCHING ADJACENT AREA (DIVIDED FINELY)

| 0100, 1111 | 0101, 1111 | 0110, 1111 | 0111, 1111 | 1000, 1111 | 1001, 1111 | 1010, 1111 | 1011, 1111 |
|---|---|---|---|---|---|---|---|
| 0100, 1110 | 0101, 1110 | 0110, 1110 | 0111, 1110 | 1000, 1110 | 1001, 1110 | 1010, 1110 | 1011, 1110 |
| 0100, 1101 | 0101, 1101 | 0110, 1101 | 0111, 1101 | 1000, 1101 | 1001, 1101 | 1010, 1101 | 1011, 1101 |
| 0100, 1100 | 0101, 1100 | 0110, 1100 | 0111, 1100 | 1000, 1100 | 1001, 1100 | 1010, 1100 | 1011, 1100 |
| 0100, 1011 | 0101, 1011 | 011,101 | | 1000, 1011 | 1001, 1011 | 1010, 1011 | 1011, 1011 |
| 0100, 1010 | 0101, 1010 | | | 1000, 1010 | 1001, 1010 | 1010, 1010 | 1011, 1010 |
| 0100, 1001 | 0101, 1001 | 0110, 1001 | 0111, 1001 | 1000, 1001 | 1001, 1001 | 1010, 1001 | 1011, 1001 |
| 0100, 1000 | 0101, 1000 | 0110, 1000 | 0111, 1000 | 1000, 1000 | 1001, 1000 | 1010, 1000 | 1011, 1000 |

METHOD AND SYSTEM FOR CONSTRUCTING VIRTUAL SPACE

CROSS REFERENCE TO RELATED APPLICATION

This application claims priority under 35 U.S.C. §119 from Japanese Patent Application No. 2007303392 filed Nov. 22, 2007, the entire contents of which are incorporated by reference herein.

BACKGROUND OF THE INVENTION

1. Field of the Invention

The present invention relates to a method and system for constructing virtual space. More particularly, the present invention relates to a method and system for constructing virtual space for rendering photographed images according to display space.

2. Description of the Related Art

It is known in the art to provide a computer system that constructs virtual space in which the real world is simulated for its users. Examples of this system include games in which user's representation called an avatar appears in a virtual world in this virtual space and systems for research, analysis, and estimation.

An example for constructing a virtual space in which the real world is simulated is photo-based rendering, which constructs a simulated virtual space by applying photographs taken in the real world into a space including the user (texture mapping).

A known application of this photo-based rendering is a system in which multiple photographs which are taken by a dedicated image capturing system in sequence at the same time are efficiently stored in an image database system in connection with their positional information, and for reproduction, the images are reproduced from a desired position and displayed in real time. Japanese Unexamined Patent Application Publication No. 11-168754.

Other examples of photo-based rendering are recording a plurality of high-definition images and background images with different viewing directions on a recording medium using their respective viewing directions as search indices, and at reproduction, detecting the viewing direction of the viewer, and generating an image by image processing for display (Japanese Unexamined Patent Application Publication No. 7-236113), an electronic visual system using positions and postures (PCT Japanese Translation Patent Publication No. 9-505138), and a method of generating an omnidirectional image from a plurality of images taken by an omnidirectional camera by interpolation (Japanese Unexamined Patent Application Publication No. 2002-092597).

An example of cameras for photographing the real world is a digital camera capable of providing computers with fine images according to digital data. A known digital camera is provided with a global positioning system (GPS) and a position sensor or a three-dimensional gyro sensor so as to record the photographing position, photographing direction, and elevation angle of photographing (Japanese Unexamined Patent Application Publication No. 2004-080359).

SUMMARY OF THE INVENTION

The present invention provides a system, method and computer program product for generating a photo-based virtual world on the basis of an image database that stores images taken by many freewill participants.

The present invention obtains image information from an image database that stores image information stored by multiple users and areas in a virtual space in association with one another on the basis of the coordinates of the viewing position, and renders images according to display space. More specifically, the present invention has the following characteristics.

The system includes a data receiving unit for receiving data over a network, an image acquisition unit for obtaining image information from an image database using the data receiving unit, the image database storing image information stored by a plurality of users, and associated information representing corresponding areas of a virtual space each having a range designated using a coordinate system commonly used by the users, a control unit for obtaining the image information associated with the areas each including a viewing position designated by the coordinates using the image acquisition unit, and rendering images using the obtained image information according to display conditions of display spaces for visualizing the areas, and a display unit for displaying the images rendered according to display conditions of the display spaces.

The method and computer program product include the steps of receiving data over a network, acquiring image information from an image database, the image database storing the image information stored by a plurality of users, and associated information representing corresponding areas of a virtual space each having a range designated using a coordinate system commonly used by the users, obtaining the image information associated with the areas each including a viewing position designated by coordinates, and rendering images using the obtained image information according to display conditions of display spaces for visualizing the areas, and displaying the images rendered according to display conditions of the display spaces.

BRIEF DESCRIPTION OF THE DRAWINGS

FIG. 1 is a schematic diagram of an embodiment of the invention.

FIG. 3 is a diagram illustrating a photographing position and photographing conditions.

FIG. 4 is a diagram of an example of managing an area with quadtree.

FIG. 5 is a diagram showing an example in which an obstacle is present.

FIG. 8 is a diagram showing an example of exterior representation of display space.

FIG. 10 is a diagram showing a virtual world using real images.

FIG. 14 is a diagram illustrating the concept of panel display on focal distance in a display space B.

FIG. 16 is a diagram illustrating a display method when another display space is included in a display space.

FIG. 17 is a diagram illustrating a display method when another display space is completely included in a display space.

FIG. 18 is a diagram illustrating a display method when a display space overlaps with another display space.

FIG. 20 is a diagram illustrating hysteresis of fade-in and fade-out.

FIGS. 34(1) and 34(2) show examples of searching an adjacent area.

FIG. 35(3) shows an example of searching an adjacent area.

DETAILED DESCRIPTION OF THE PREFERRED EMBODIMENTS

Figure 2:
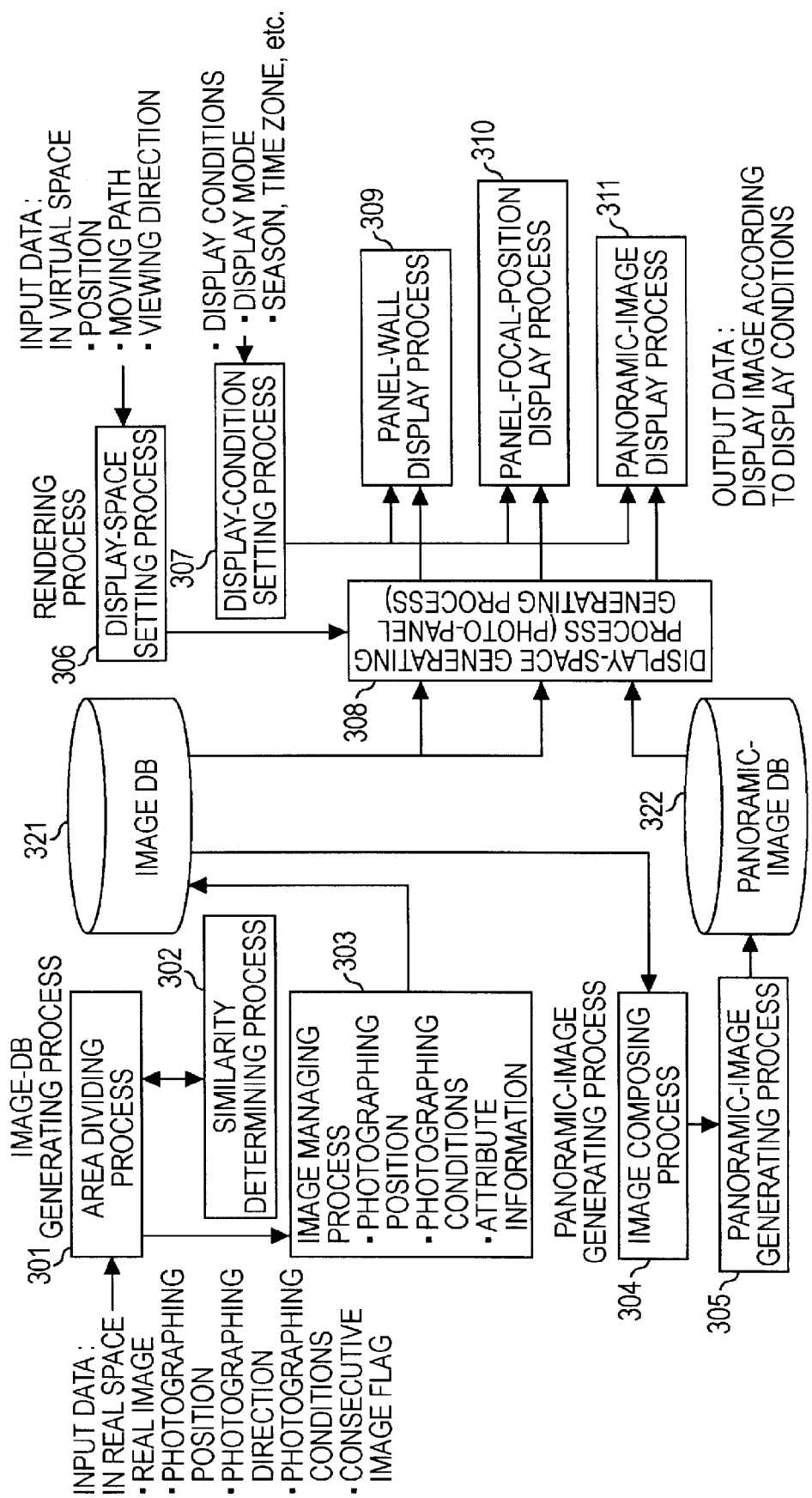
FIG. 2 is a schematic diagram of a system according to the embodiment.

According to an embodiment of the invention, a virtual world in which the real world is reproduced with high fidelity can be constructed quickly on the basis of the images photographed by many freewill participants. This allows early construction of a vast virtual world and allows the information to be updated constantly by many people. Moreover, a past world can be reproduced by recording updated history.

Furthermore, photographed images are stored in areas divided by the area dividing means, so that, for reproduction of images, areas having no stored image can be interpolated by the image in the adjacent area. Thus only images photographed in minimum areas are required.

If the details of a photograph are unclear, they can be clarified by comparing information such as the photographing position, photographing direction, and elevation angle of photographing with the display in the virtual space.

According to an embodiment of the invention, a system is provided for generating a photo-based virtual world on the basis of an image database that stores images photographed by many freewill participants.

Images for constructing virtual space have information on their respective photographing positions for associating the images with areas in the virtual space. The photographing position information is expressed by a coordinate system (for example, a latitude and longitude system) commonly used by many participants. Images provided by many participants are real world images that can be joined, composed, or cut. This embodiment uses images taken by digital cameras, for example. Preferably, information on the photographing position of these images is latitude and longitude information obtained using a GPS system built in the digital cameras. Alternatively, it may be position information added to the image data (for example, input latitude and longitude).

Conditions of images taken by many participants include, in addition to the photographing position, photographing direction, elevation angle of photographing, photographing distance, and photographing date (date and time). Attribute information includes the image size, resolution, shutter speed, lens aperture, and focal length. This information is automatically added to the images according to the performance of the digital camera or manually added by another device. Photographed images having positional information, photographing conditions and attribute information are referred to as real images.

Real images provided by many participants are stored in association with areas in a virtual space on the basis of the photographing positions of the real images. The photographing positions are designated, for example, using a latitude and longitude system, and the ranges of areas in the virtual space are defined by, for example, the ranges of the latitude and longitude. Thus, the photographing position and areas in the virtual space including the photographing positions can be associated with each other. The photographed images and the area in the virtual image are entered in an image database (DB) in association with each other.

The entry is made as follows: If no image is entered in the area in the virtual space including the photographing position, the image is entered in association with the area. If an image is entered in the area in virtual space including the photographing position, the image is compared with the stored image. If the comparison shows that photographing conditions (for example, the direction, the elevation angle of photographing) are out of predetermined ranges, the image is entered in the same area. If the comparison shows that photographing conditions (for example, the photographing direction, the elevation angle of photographing) are within the predetermined ranges, and the similarity of the images is within a predetermined range, the image is equally entered in the same area. In contrast, if the comparison shows that photographing conditions (for example, the photographing direction, the elevation angle of photographing) are within the predetermined ranges and the similarity of the images is out of the predetermined range, the area in the virtual space is divided and the image is entered in a different area. The division and comparison are repeated until the conditions of entering the image are met.

The real image entered in association with the area in the virtual space is rendered according to the position and direction in the virtual space to view the image. That is, an area including the photographing position corresponding to the viewing position is determined according to the viewing position, and thus a real image in the photographing direction corresponding to the viewing direction is selected from the real images associated with the determined area. The selected real image is rendered according to the display space to construct a virtual space.

FIG. 1 shows the outline of an embodiment of the invention, illustrating the construction of a virtual space based on a real image selected from an image database.

FIG. 1(1) shows a case in which the user views a display space 501 that constitutes a virtual space from the exterior. FIG. 1(2) shows a case in which the user views the interior of the display space 501 indicated by a viewing direction 531 while moving in the display space 501. A real image selected from the image database is rendered in the display space 501 according to the coordinates of the user's viewing position 511. Thus, the user can feel a virtual world in which the real world is reproduced with high fidelity by moving.

FIG. 2 is a schematic diagram of a system according to the embodiment. A real image is entered in an area in the virtual space according to the photographing position to create an image database (DB) and a panoramic image database (DB). A display space is constructed according to the real image stored in the created image DB to generate a virtual space.

Real images photographed in the real world include information on the position, direction, and conditions of photographing, and panoramic image information (for example, a consecutive image flag that allows entry of panoramic images). In creating an image DB 321, an area dividing process 301 divides the area of the virtual space according to the determination in a similarity determining process 302. An image managing process 303 classifies the real images into the divided areas by the direction and conditions of photographing (date and focal length), and enters them in the image DB 321. In a rendering process, a display-space generation process 308 is performed according to display-space settings 306 (position, moving path, and viewing direction in the virtual space) and display-condition settings 307 (for example, display mode, season, and time zone). The display space generation process 308 generates spaces (shapes such as cylinders, semi-spheres, spheres and other shapes for panels) necessary for a panel wall display 309, a panel focal position display 310, and a panoramic image display 311. In a panoramic image generating process, a panoramic image generation process 305 is performed by an image composing process 304 to create a panoramic image DB 322.

FIG. 3 illustrates a photographing position and photographing conditions.

FIG. 3(1) is a diagram illustrating photographing a real landscape in one photographing direction from one photographing position. The real image photographed in this way has photographing conditions including a photographing position and a photographing direction.

FIG. 3(2) is a diagram illustrating an example in which the photographing direction is classified into eight directions, (north (N), northeast (NE), east (E), southeast (SE), south (S), southwest (SW), west (W), and northwest (NW)). If photographing direction is classified into eight directions, a photographing direction 331, for example, is included in the range of the photographing direction N. The photographing direction can also be classified into 16 or 32 directions.

FIG. 3(3) is a diagram illustrating an example in which the elevation angle of photographing is classified into five directions, upward (U), obliquely upward (UH), horizontally (H), obliquely downward (DH), and downward (D). When the elevation angle is classified into five directions, an elevation angle of photographing 341, for example, is included in the range H of the elevation angle of photographing. The elevation angle of photographing may be classified into nine directions.

FIG. 4 illustrates an example of managing an area with quadtree. An area in the virtual space is divided into four, and a real image is entered into the divided areas.

FIG. 4(1) shows an example of the result of division of an area S into four areas, to which area IDs S-1 to S-4, are assigned clockwise starting in the upper left corner. The divided area S-1 is further divided into S-11 to S-14, and the divided area S-3 is further divided into S-31 to S34. The division of the areas is executed by dividing the range designated by a latitude and longitude system into four. The real image is compared with the image stored in the divided area including the photographing position, and is entered into the same area under the condition that predetermined requirements are met. The division of the areas is repeated until the requirements for entering the image are met.

FIG. 4(2) shows an example of managing the divided areas with quadtree. The area S is divided into four, to which area IDs, S-1 to S-4, are attached. The area S-1 is further divided into areas S-11 to S-14. Likewise, the area S-12 is divided into areas S-121 to S-124, the area S-3 is further divided into areas S-31 to S-34, and the area S-33 is further divided into areas S-331 to S-334. Thus, an area including the photographing position can be determined from the photographing position. The division may be managed with binarytree such that an area is divided into two vertically and laterally in sequence.

FIG. 5 shows an example in which an obstacle is present, illustrating division when an obstacle is present and entering of a real image into the divided areas.

FIG. 5(1) shows a case in which an obstacle 401 is present between a photographing position P1 and a photographing position P2. FIG. 5(2) shows a case in which an image photographed at the photographing position P1 is entered in the area S in the virtual space including the photographing position P1. FIG. 5(3) shows that after the image photographed in the photographing position P1 has been entered, the area S is repeatedly divided until the photographing positions P1 and P2 are included in different areas so that the image photographed at the photographing position P2 is entered in the divided area S-1 of the virtual space including the photographing position P2, while the image photographed in the photographing position P1 is reentered in the area S-3 including the photographing position P1, because the image photographed in the photographing position P2 is different from the image entered in the area S including the photographing position P2.

Figure 6:
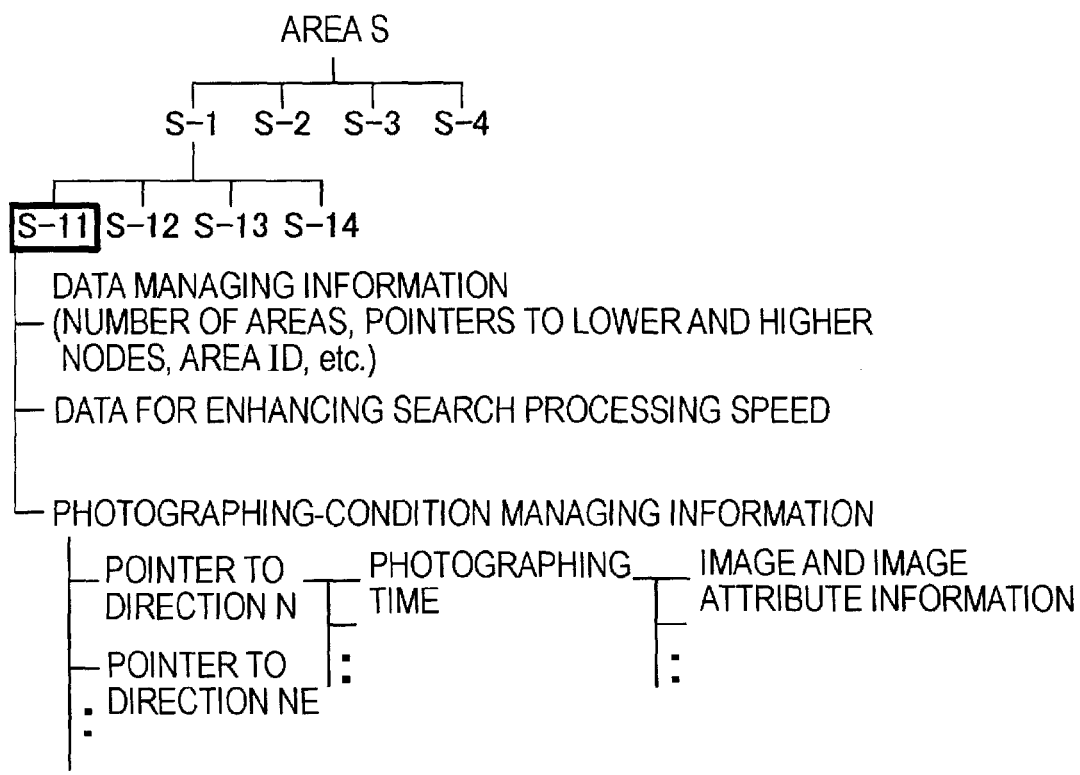
FIG. 6 is a diagram showing an example of an image database that employs quadtree area management.

FIG. 6 shows an example of an image database that employs quadtree area management, illustrating a schematic structure of an image database in which real image data and photographing conditions and image attributes are classified for each divided area.

The area S is divided into the areas S-1 to S-4, and the area S-1 is further divided into areas S-11 to S-14. The database has data managing information (the coordinates and the number of areas, pointers to the lower and higher nodes, area IDs and so on) and data for enhancing search processing speed (information on photographing directions). The database further has photographing-condition managing information including a photographing time for each photographing direction, and image and image-attribute information (image size, resolution, and camera-attribute information) for each photographing time, which are classified for management. The database further has pointers for a panoramic-image DB.

For example, the database stores real-image data for each photographing direction in a specified range. The real-image data for each photographing direction is indicated by pointers of eight directions, for example. Real images are classified by photographing time (season, morning, noon, or evening, time, etc.) for example. If data on the distance to a focused object is present, real images are further classified by the distance to the object.

In photographing the real world, images vary depending on the season and the time of day even at the same location and in the same direction. Accordingly, the time-base similarity of the images is checked and if the similarity is out of a predetermined range, the time space is divided to manage the contents. In other words, the real images are classified by time zone such as photographing time and entered in the areas.

Image data are searched on the basis of the structure of the image database. Specifically, in entering an image, an area in the virtual space including the photographing position of the image is determined according to the photographing position and thus a real image stored in the area can be selected. In other words, since the area of the virtual space is managed with quadtree, the area including the photographing position can be determined by following the tree structure by comparison with the coordinates of the area range.

For example, if position $P(X, Y)$ is given, it is compared with the coordinates of the area $((X0, Y0), (X1, Y1))$ to find an area that satisfies $X0 \leq X \leq X1$ and $Y0 \leq Y \leq Y1$. Thus, a real image stored in the found area can be selected. In reproducing (rendering) the real image to construct a virtual display space, the image database is searched for a real image using the position and direction of viewing the display space as the photographing position and direction of the real image, and the selected real image is rendered to construct a virtual display space in which the real world is reproduced with high fidelity.

In reproducing an omnidirectional real image viewed from one position, real images in all the directions are not sometimes stored in the area including the position. However, if a real image in the corresponding photographing direction is stored in the adjacent area, a similar image can be generated using it instead with high possibility. In this case, the management of data with a quadtree structure allows an image in the adjacent area to be selected according to a clear search rule.

For example, areas adjacent to the area S-13 are, when divided evenly, areas S-12, S-21, S-24, S-31, S-42, S-41, S-14, and S-11 clockwise from the north. However, areas are not always divided evenly. Accordingly, if areas are not managed with a tree structure, a higher area is the adjacent area, because area division is not always made evenly. That is, for areas S-21 and S-24, area S-2 is the adjacent area, and for areas S-42 and S-41, area S4 is the adjacent area.

The adjacent area search will be described using a method of labeling the areas by binary notation. A normalized space whose lower left end is $(0, 0)$ and upper right end is $(1, 1)$ is recursively divided into four areas. When the four-area division is repeated evenly n times, the space is divided into $2^n \times 2^n$ areas. The coordinates of the lower left and the upper right ends of the area are expressed as $(k/2^n, j/2^n)$ and $((k+1)/2^n, (j+1)/2^n)$, respectively, where k and j are integers that satisfy $0 \leq k$ and $j<2^n$, respectively. That is, the areas are identified by the three variables, the degree n of divisions and positions k and j. For example, a binary label $(0, 0)$ corresponds to area ID S-4, a binary label $(1, 1)$ corresponds to area ID S-2, and a binary label $(00, 00)$ corresponds to area ID S-44.

The areas adjacent to area $(k(\frac{1}{2})^n, j(\frac{1}{2})^n)$, if divided evenly, can be determined as follows:

A northern adjacent area is expressed as $(k(\frac{1}{2})^n, (j+1)(\frac{1}{2})^n)$, $j<2^n-1$. If $j=2^n-1$, the area is the northernmost area, so that no adjacent area is present.

A northeast adjacent area is expressed as $((k+1)(\frac{1}{2})^n, (j+1)(\frac{1}{2})^n)$, $k<2^n-1$ and $j<2^n-1$. If $k=2^n-1$ or $j=2^n-1$, the area is the northernmost or the easternmost area, so that no adjacent area is present.

An eastern adjacent area is expressed as $((k+1)(\frac{1}{2})^n, j(\frac{1}{2})^n)$, $k<2^n-1$. If $k=2^n-1$, the area is the easternmost area, so that no adjacent area is present.

A southeast adjacent area is expressed as $((k+1)(\frac{1}{2})^n, (j-1)(\frac{1}{2})^n)$, $k<2^n-1$. If $k=2^n-1$ or $j=0$, the area is the southernmost or the easternmost area, so that no adjacent area is present.

A southern adjacent area is expressed as $(k(\frac{1}{2})^n, (j-1)(\frac{1}{2})^n)$, $j>0$. If $j=0$, the area is the southernmost area, so that no adjacent area is present.

A southwest adjacent area is expressed as $((k-1)(\frac{1}{2})^n, (j-1)(\frac{1}{2})^n)$, $k>0$ and $j>0$. If $k=0$ or $j=0$, the area is the southernmost area or the westernmost area, so that no adjacent area is present.

A western adjacent area is expressed as $((k-1)(\frac{1}{2})^n, j(\frac{1}{2})^n)$, $k>0$. If $k=0$, the area is the westernmost area, so that no adjacent area is present.

A northwest adjacent area is expressed as $((k-1)(\frac{1}{2})^n, (j+1)(\frac{1}{2})^n)$, $k>0$ and $j<2^n-1$. If $k=0$ or $j=2^n-1$, the area is the northernmost or the westernmost area, so that no adjacent area is present.

The areas adjacent to area $(k(\frac{1}{2})^n, j(\frac{1}{2})^n)$, if divided unevenly and roughly ($m \leq n$), can be determined as follows, where int( ) is a function whose fractional portion is discarded into an integer.

A northern adjacent area is expressed as $(int(k/2^{n-m})(\frac{1}{2})^m, int((j+1)/2^{n-m})(\frac{1}{2})^m)$, $j<2^n-1$. If $j=2^n-1$, the area is the northernmost area, so that no adjacent area is present.

A northeast adjacent area is expressed as $(int((k+1)/2^{n-m})(\frac{1}{2})^m, int((j+1)/2^{n-m})(\frac{1}{2})^m)$, $k<2^n-1$ and $j<2^n-1$. If $k=2^n-1$ or $j=2^n-1$, the area is the northernmost or the easternmost area, so that no adjacent area is present.

An eastern adjacent area is expressed as $(int((k+1)/2^{n-m})(\frac{1}{2})^m, int(j/2^{n-m})(\frac{1}{2})^m)$, $k<2^n-1$. If $k=2^n-1$, the area is the easternmost area, so that no adjacent area is present.

A southeast adjacent area is expressed as $(int((k+1)/2^{n-m})(\frac{1}{2})^m, int((j-1)/2^{n-m})(\frac{1}{2})^m)$, $k<2^n-1$ and $j>0$. If $k=2^n-1$ or $j=0$, the area is the southernmost or the easternmost area, so that no adjacent area is present.

A southern adjacent area is expressed as $(int(k/2^{n-m})(\frac{1}{2})^m, int((j-1)/2^{n-m})(\frac{1}{2})^m)$, $j>0$. If $j=0$, the area is the southernmost area, so that no adjacent area is present.

A southwest adjacent area is expressed as $(int((k-1)/2^{n-m})(\frac{1}{2})^m, int((j-1)/2^{n-m})(\frac{1}{2})^m)$, $k>0$ and $j>0$. If $k=0$ or $j=0$, the area is the southernmost or the westernmost area, so that no adjacent area is present.

A western adjacent area is expressed as $(int((k-1)/2^{n-m})(\frac{1}{2})^m, int(j/2^{n-m})(\frac{1}{2})^m)$, $k>0$. If $k=0$, the area is the westernmost area, so that no adjacent area is present.

A northwest adjacent area is expressed as $(int((k-1)/2^{n-m})(\frac{1}{2})^m, int((j+1)/2^{n-m})(\frac{1}{2})^m)$, $k>0$ and $j<2^n-1$. If $k=0$ or $j=2^n-1$, the area is the northernmost or the westernmost area, so that no adjacent area is present.

The areas adjacent to area $(k(\frac{1}{2})^n, j(\frac{1}{2})^n)$, if divided unevenly and finely ($m \geq n$), can be determined as follows: Northern, eastern, southern, and western areas are adjacent to a plurality of areas with the same or different degree of divisions, to which all areas s within $0 \leq s \leq 2^{m-n}$ apply, where m is the degree of division of the area that is divided most finely. However, the degree of division depends on the adjacent area; for the part having no m-divided area, a higher area is used.

A northern adjacent area is expressed as $(k \times 2^{m-n}+s)(\frac{1}{2})^m, (j+1) \times 2^{m-n})(\frac{1}{2})^m)$, $j<2^n-1$. If $j=2^n-1$, the area is the northernmost area, so that no adjacent area is present.

A northeast adjacent area is expressed as $((k+1)\times 2^{m-n})(\frac{1}{2})^m, ((j+1)\times 2^{m-n})(\frac{1}{2})^m)$, $k<2^n-1$ and $j<2^n-1$. If $k=2^n-1$ or $j=2^n-1$, the area is the northernmost or the easternmost area, so that no adjacent area is present.

An eastern adjacent area is expressed as $((k+1)\times 2^{m-n})(\frac{1}{2})^m, (j\times 2^{m-n}+s)(\frac{1}{2})^m)$ $k<2^n-1$. If $k=2^n-1$, the area is the easternmost area, so that no adjacent area is present.

A southeast adjacent area is expressed as $((k+1)\times 2^{m-n})(\frac{1}{2})^m, (j\times 2^{m-n}-1)(\frac{1}{2})^m)$, $k<2^n-1$ and $j>0$. If $k=2^n-1$ or $j=0$, the area is the southernmost or the easternmost area, so that no adjacent area is present.

A southern adjacent area is expressed as $((k\times 2^{m-n}+s)(\frac{1}{2})^m, ((j\times 2^{m-n}-1)(\frac{1}{2})^m)$, $j>0$. If $j=0$, the area is the southernmost area, so that no adjacent area is present.

A southwest adjacent area is expressed as $((k\times 2^{m-n}-1)(\frac{1}{2})^m, (j\times 2^{m-n}-1)(\frac{1}{2})^m)$, $k>0$ and $j>0$. If $k=0$ or $j=0$, the area is the southernmost or the westernmost area, so that no adjacent area is present.

A western adjacent area is expressed as $((k\times 2^{m-n}-1)(\frac{1}{2})^m, (j\times 2^{m-n}+s)(\frac{1}{2})^m)$, $k>0$. If $k=0$, the area is the westernmost area, so that no adjacent area is present.

A northwest adjacent area is expressed as $((k\times 2^{m-n}-1)(\frac{1}{2})^m, (j+1)\times 2^{m-n})(\frac{1}{2})^m)$, $k>0$ and $j<2^n-1$. If $k=0$ or $j=2^n-1$, the area is the northernmost or the westernmost area, so that no adjacent area is present.

Figure 7:
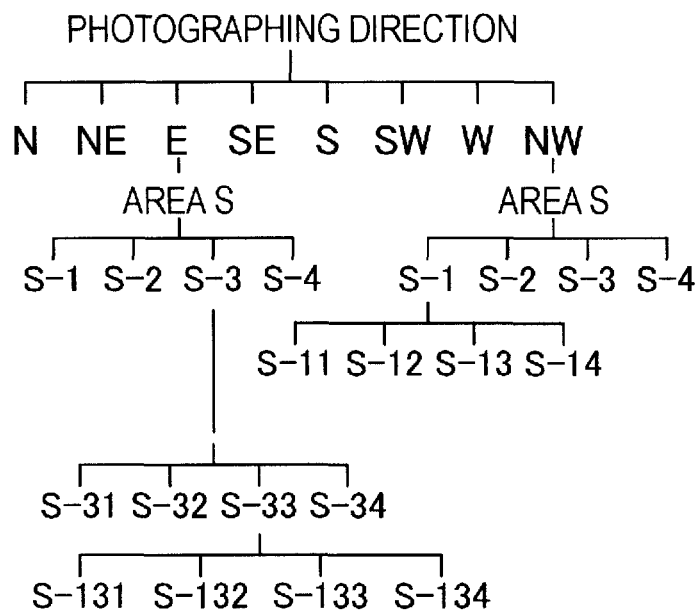
FIG. 7 is a diagram showing an example of area management for each photographing direction.

FIG. 7 shows that areas can be managed for each photographing direction. To enter real images, the area is managed for each photographing direction. In this case, the area has a quadtree structure for each of eight directions (N, NE, E, SE, S, SW, W, and NW). If there are many photographing directions having no image, area division in the directions can be omitted.

FIG. 8 shows examples of exterior representation of display space, for indicating where a display space including a real image is present in the virtual world.

This embodiment has four kinds of exterior representations of display space that constitutes virtual space. Typical exterior representations of display space are a cylindrical shape, a semi-sphere, a sphere, and a particle (cloudy shadow). Display space can be generated in one area or two or more areas (for example, higher-level areas of a quadtree structure). In the case of panoramic display, the shape (cylindrical shape, semi-sphere, or sphere) of panoramic image space is predetermined when an image is entered. Such display space may be subjected to rendering in a single color for one shape or one or more representative real images in the display space may be subjected to texture mapping.

FIG. 8(1) is a diagram showing a case in which the display space is a cylindrical display space 501. FIG. 8(2) is a diagram showing a case in which the display space is a semi-sphere 502. FIG. 8(3) is a diagram showing a case in which the display space is a sphere 503. FIG. 8(4) is a diagram showing a case in which the display space is a particle 504. Virtual space is constructed of such display spaces. The user moves in the virtual space by moving in those display spaces.

One of the display conditions of such display spaces, transparency, includes "visible" (0% in transparency), "invisible" (100% in transparency), and "translucent". "Visible" indicates that the display spaces are displayed but, if there is a visible display space in the foreground, the visible display space is hidden and so cannot be seen; if there is a translucent display space, the visible display space can be seen through. "Invisible" indicates that the display space is not displayed at all. "Translucent" indicates that a display space in the background is seen through.

A method for translucent display is as follows: The intensity of light I is expressed as $I=\alpha I2+(1-\alpha)I1$, where $I1$ is the intensity of light of an image on the plane on this side, $I2$ is the intensity of light of the plane on the back, and $\alpha$ ($0\leq\alpha\leq 1.0$) is transmittance. If $\alpha=1$, the display space becomes completely transparent, and if $\alpha=0$, the display space becomes completely opaque.

Examples of methods for changing display conditions are a parameter setting predetermined by the user, an interactive parameter setting using a command, and a dynamic parameter setting (parameter setting by context awareness) by user's behavior.

With this parameter setting by context awareness, display conditions are changed according to user's viewing period of time. Specifically, when the user views for more than a given period of time, a translucent display space in the foreground is displayed more clearly as "a visible space". Furthermore, with this parameter setting by context awareness, display conditions are changed so that switching among visible display spaces fade in and out as the user moves.

Interior representations of a display space, that is, representations when the user who has moved into the display space for rendering a real image and viewed the rendered image include a panoramic display, a panel display on a wall, a panel display on focal distance, and a mixture thereof.

The panoramic display is a representation of a real image mapped on the inner surface of a display space (a cylindrical shape, a semi-sphere, a sphere, or a particle).

The panel display on a wall is a representation of a real image mapped on the wall of a display space using a multiplex display technique such as overlapping and scrolling, so that the user can view an image in the space on this side from among the images in the viewing direction.

The panel display on focal distance is a representation of an image remote from the viewing position by the photographing distance.

A mixture of those display methods generates the interior of the display space with a mixed representation according to the attributes of the real image and the characteristics of the display space.

One of the real-image display conditions, transparency, includes "visible" (0% in transparency), "invisible" (100% in transparency), and "translucent". "Visible" indicates that the real image is displayed, but if there is a visible real image in the foreground, the visible real image is hidden and so cannot be seen; if there is a translucent real image, the visible real image can be seen through. "Invisible" indicates that the real image is not displayed at all. "Translucent" indicates that a real image in the background is seen through. When no real image is entered and so not present, it is displayed as a "plane monochrome" image under these display conditions.

The real-image display conditions include, as attribute condition settings, photographing time (morning, evening, season) for example. The real world in the morning, at noon, and in the evening or from time to time can be reproduced with high fidelity according to set photographing time. The conditions further include a setting on whether to display an image in the adjacent area or not. For the adjacent area display, there is a setting for indicating that it is an image from the adjacent area. This allows the user to know that the area has no image and urges the user to enter an image. The settings further include a photographing date setting. A real image has information on its photographing date and time. Accordingly, if the photographing date of reproduction is set, the past state can be reproduced from the real image before the set photographing date even if the real world has been updated because a new building or the like has been built.

Examples of methods for changing real-image display conditions are a parameter setting predetermined by the user, an interactive parameter setting using a command, and a dynamic parameter setting (by context awareness) by user's behavior.

With this parameter setting by context awareness, display conditions are changed according to user's viewing period of time. Specifically, when the user views for more than a given period of time, a translucent image in the foreground is displayed more clearly as "a visible image". Furthermore, with this parameter setting by context awareness, display conditions are changed so that switching among visible images fade in and out as the user moves.

Figure 9:
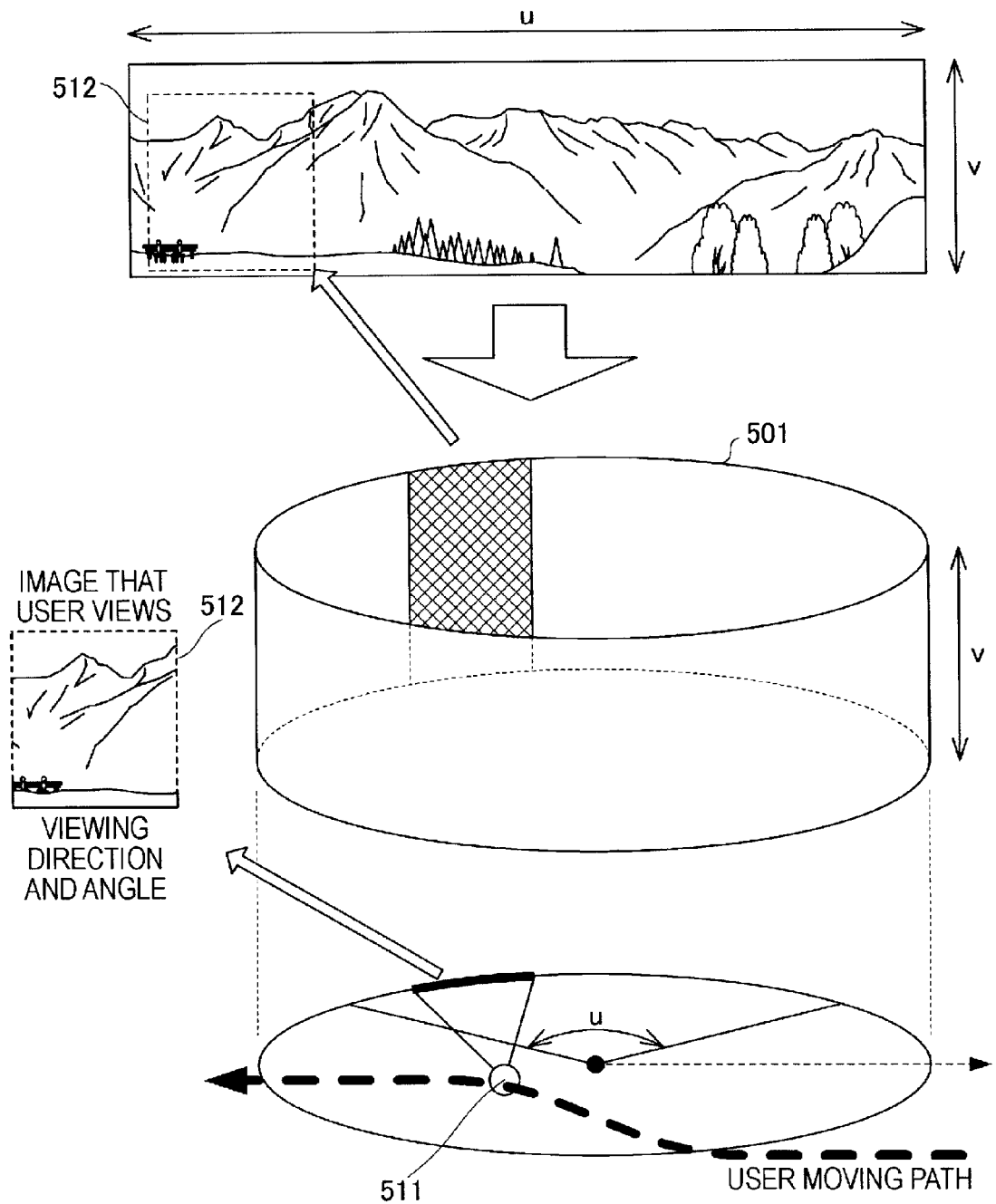
FIG. 9 is a diagram illustrating an example of panoramic display.

FIG. 9 is a diagram illustrating an example of panoramic display. Panoramic display is allowed by mapping an image onto the inner surface of a cylinder, for example. The user can see the image from the interior of the space. In FIG. 9, v indicates the height of the display space, and u indicates a viewing angle from the center of the display space. The user can view a part 512 of the mapped image from, for example, a viewing position 511 in the display space by moving.

FIG. 10 illustrates where the display space having the real image is present in the virtual world.

FIG. 10(1) is a diagram showing a case in which the display space 501 constituting the virtual world is cylindrical in shape, and viewed from the exterior of the display space. FIG. 10(2) is a diagram illustrating that the user views the interior of the display space in the viewing direction 531 while moving in the display space. When entering the panoramic display space (a cylindrical shape, a semi-sphere, a sphere, or a particle), the user can see, for example, a panoramic image in the space, and so can sense the virtual world by moving.

Figure 11:
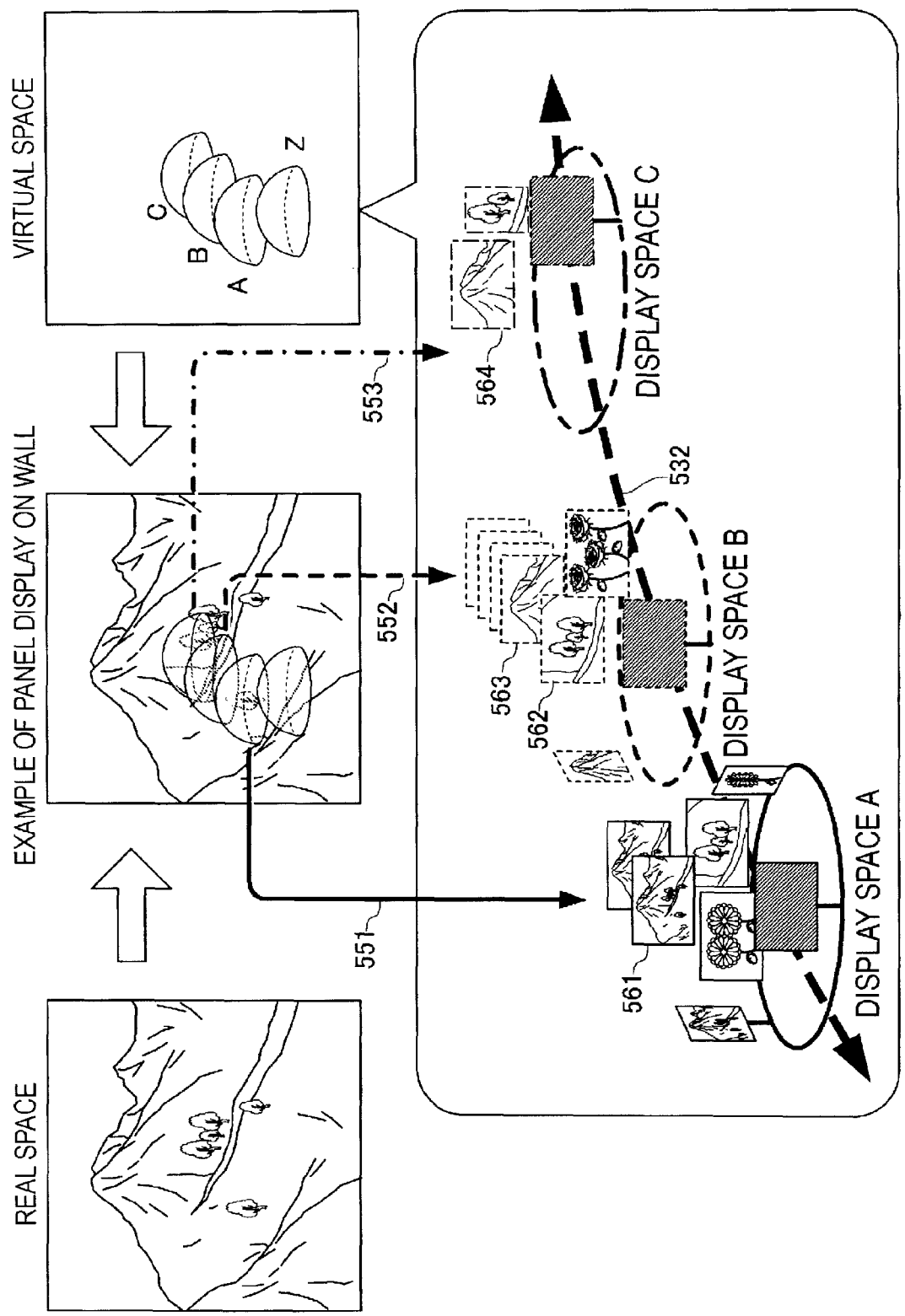
FIG. 11 is a diagram illustrating the concept of panel display on wall.

FIG. 11 is a diagram illustrating the concept of the panel display on wall. A real image stored in the area has information including a photographing position, a photographing direction, and an elevation angle of photographing. The area has a range designated using a coordinate system. Thus, the real image stored in the area can be rendered by mapping it on the wall of, for example, a semispherical wall in the photographing direction in the range of the area.

FIG. 11 conceptually illustrates the operation of displaying pictures taken while walking along the skirts of a mountain in the real space onto the panel walls of virtual display spaces A, B, and C along arrows 551, 552, and 553. When an avatar moves along a broken line 532 from the display space A through the display space B to the display space C in the panel display on wall, the image on the wall of the display space changes according to the position of the avatar. The display space A has distant mountains 561, the display space B has trees 562 in the foreground of mountains 563, and display space C has a summit landscape 564. Therefore, the user feels as if moving actually in changing scenery. Moreover, since the real image is rendered on all the walls along the panel using a multiplex display technique including overlapping and scrolling, the user feels as if in the real space.

Figure 12:
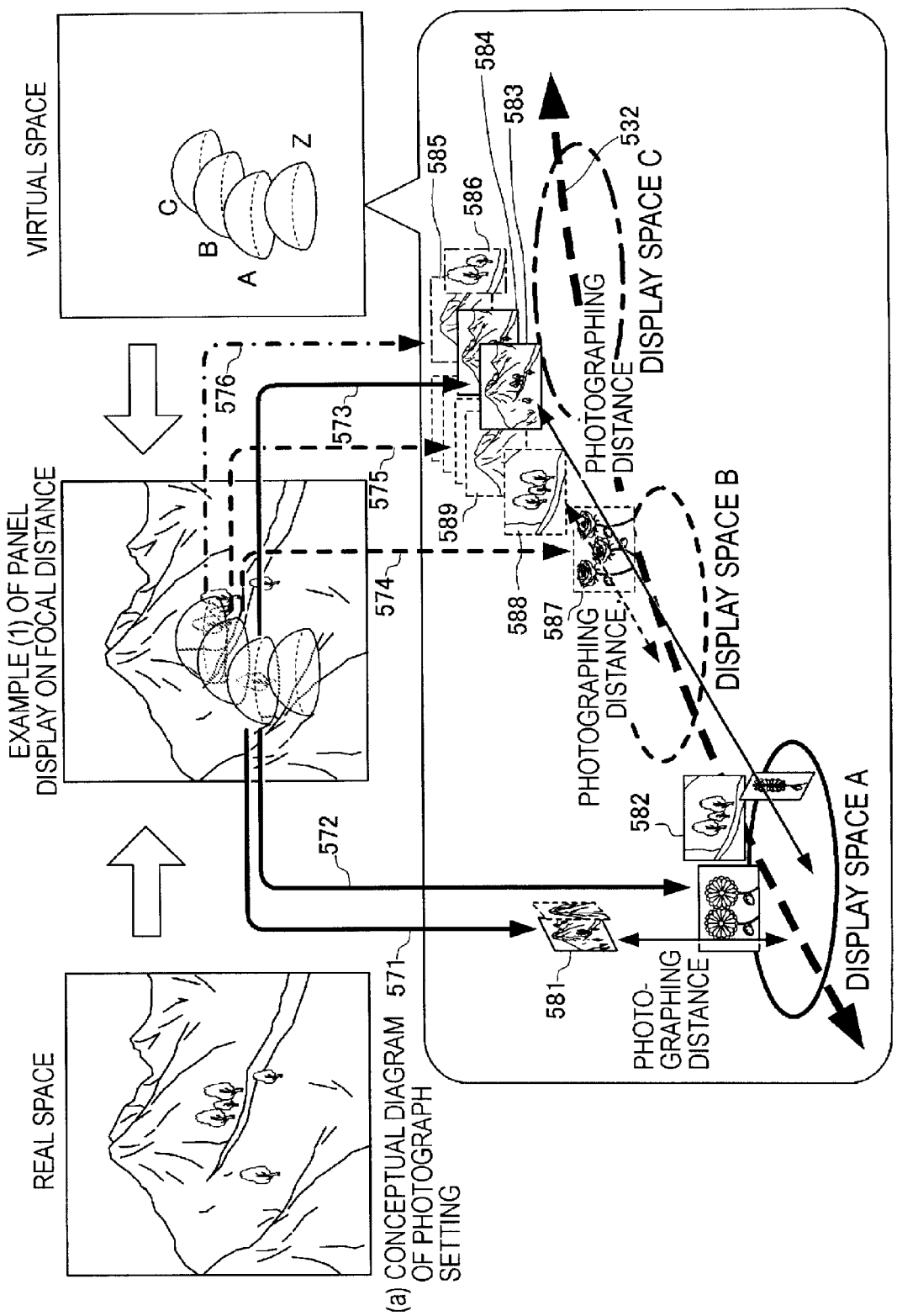
FIG. 12 is a diagram illustrating the concept of panel display on focal distance.

FIG. 12 is a diagram illustrating the concept of panel display on focal distance. A real image stored in the area further has information on a photographing distance in addition to a photographing position, a photographing direction, and an elevation angle of photographing. Therefore, a real image stored in an area determined according to the viewing position can be rendered by mapping it on a wall in the distance according to the photographing distance from the viewing position in the display space.

FIG. 12 conceptually illustrates the operation of displaying pictures into the display space A using arrows 571, 572, and 573, into the display space B using arrows 574 and 575, and into the display space C using arrow 576.

Figure 13:
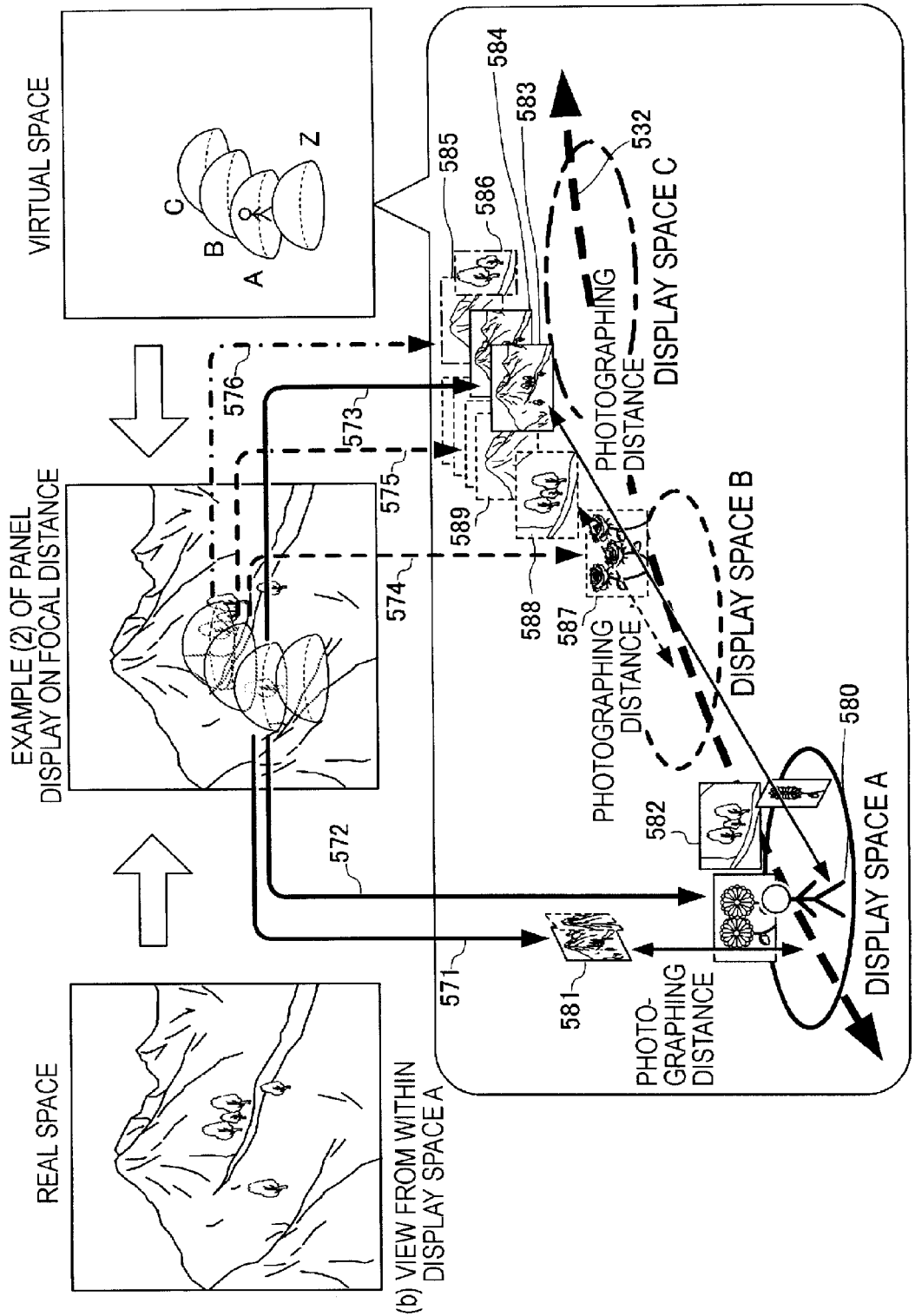
FIG. 13 is a diagram illustrating the concept of panel display on focal distance in a display space A.

FIG. 13 is a diagram illustrating the concept of panel display on focal distance in the display space A. When an avatar 580 moves along the broken line 532 to the display space A by the panel display on the focal distance, the image on the wall of the display space A is displayed according to the position of the avatar 580. As a result, the user can see, in the display space A, nearby mountains 581, nearby trees 582, distant mountains 583 and 584 according to the photographing direction.

FIG. 14 is a diagram illustrating the concept of panel display on focal distance in the display space B. When the avatar 580 moves along the broken line 532 to the display space B by the panel display on the focal distance, the image on the panel wall of the display space B is displayed according to the position of the avatar 580. As a result, the user can see, in the display space B, nearby flowers 587, nearby trees 588, nearby mountains 589, distant mountains 585, and distant trees 586 according to the photographing direction.

Figure 15:
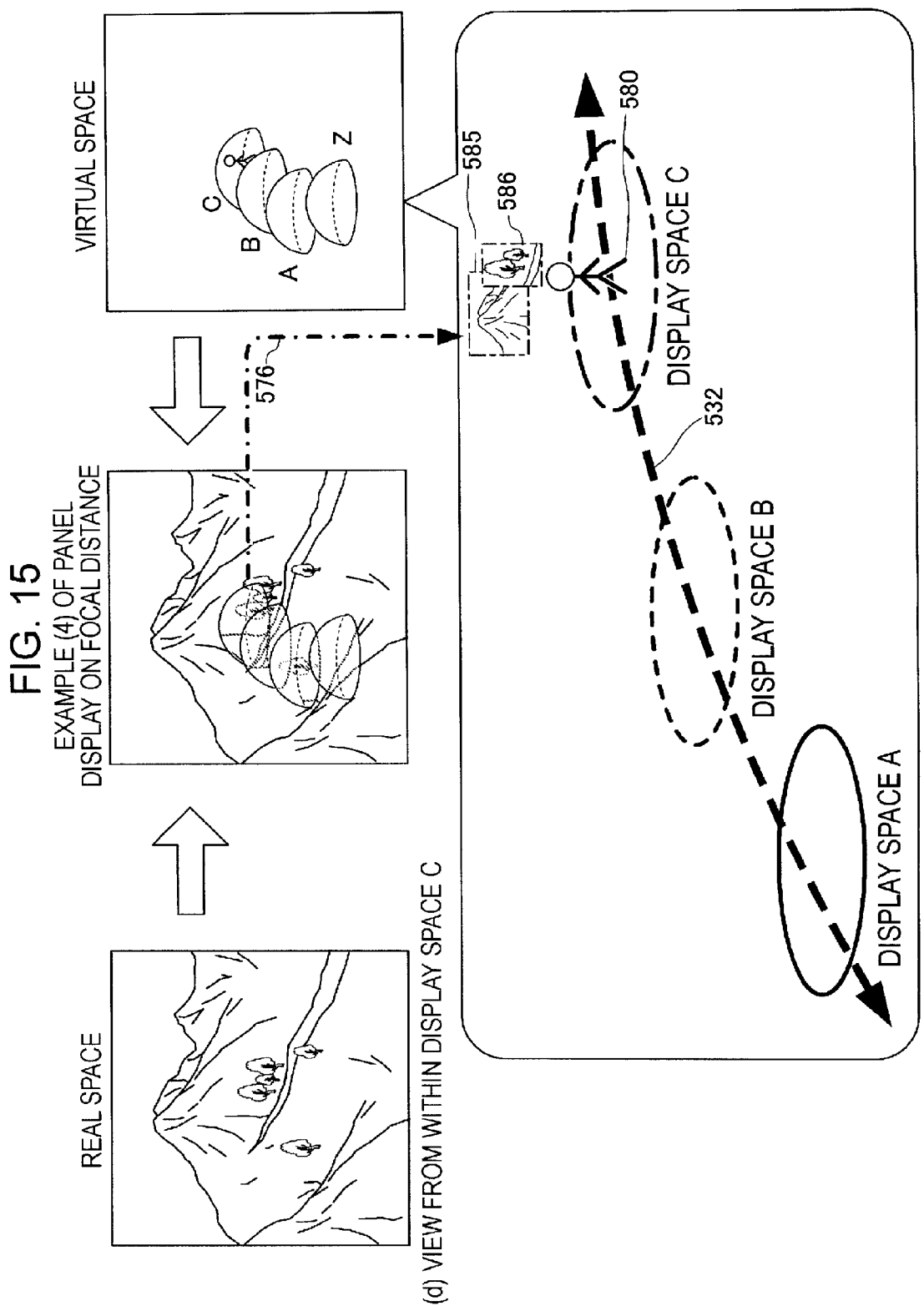
FIG. 15 is a diagram illustrating the concept of panel display on focal distance in a display space C.

FIG. 15 is a diagram illustrating the concept of panel display on focal distance in the display space C. When the avatar 580 moves along the broken line 532 to the display space C by the panel display on the focal distance, the image on the panel wall of the display space C is displayed according to the position of the avatar 580. As a result, the user can see, in the display space C, the nearby mountains 585 and the nearby trees 586 according to the photographing direction.

FIGS. 16 to 20 illustrate examples of methods for displaying a real image.

FIG. 16 illustrates a display method when another display space is included in a display space. For a panoramic image, when another display space 602 is present within the viewing angle of the user in a display space 601, the display space 602 is displayed visibly, invisibly, or translucently. The included display space 602 is displayed translucently and in a context awareness mode. When the user views the display space 602 for a given period of time or more, the display space 602 shifts from translucent display to invisible display, so that the display space 601 on the back is displayed clearly.

FIG. 17 illustrates a display method when another display space is completely included in a display space. For a panoramic image, when a display space 612 in which the user is present is completely included in another display space 611, an image in the innermost display space 612 is displayed. When the image in the display space 612 is displayed translucently, and the display space 611 on the back is displayed transparently and in a context awareness mode and when the user views for a given period of time or more, an image in the display space 612 on this side shifts from translucent to clear visible display.

FIG. 18 illustrates a display method when a display space overlaps with another display space. For a panoramic image, when a display space 621 and another display space 622 overlap, an image in the display space adjacent to the center of the overlapping plane is displayed. The display image may be displayed translucently so that an image in the other display space is displayed.

When the user moves from one display space to another, the image on this side is faded out and an image on the back of the next space may be faded in according to estimated passing time t. When the overlapping area is large, the image switching between fade-in and fade-out may be performed not in all the overlapping area but only in the central area of the overlapping area (overlapping central area). Furthermore, when the overlapping area is large and when image switching is performed in the overlapping area or fade-in fade-out image switching is performed in the overlapping central area, changes in the screen sensitive to zigzag or fluctuating movement can be reduced by setting a buffer area or introducing fade-in fade-out with a hysteresis characteristic.

Figure 19:
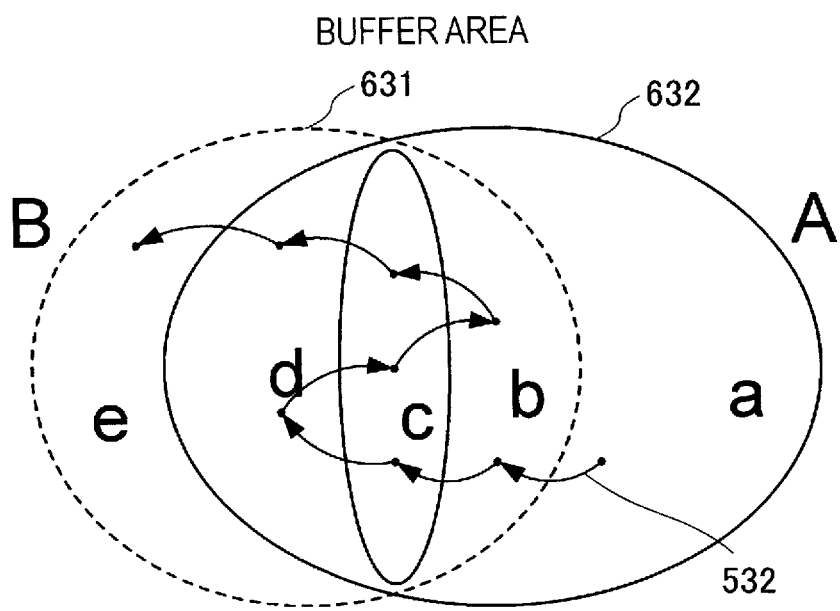
FIG. 19 is a diagram illustrating a display method when display spaces overlap, in which an avatar is moving.

FIG. 19 illustrates a display method when display spaces overlap, in which an avatar is moving. A buffer area c between the display spaces is provided, at which an image to be displayed in the display space is switched. The buffer area c displays the previous image according to the moving direction. For example, assume that the user moves from point a to point b, and from the point b to the buffer area c. That is, the user moves from the display space A to the buffer area c, so that the buffer area c displays the image in the previous display space A. When the user moves from the buffer area c to point d, the point d displays the image in the display space B. Accordingly, assuming that the user path is a→b→c→d→c→b→c→d→e, the world displayed changes to A→A→A→B→B→A→A→B→B. The buffer area c displays the image in the previous display space A or B.

FIG. 20 shows hysteresis of fade-in and fade-out. In fade-in and fade-out, transmittance α is expressed as the function α(t) of time t.

FIG. 20(1) shows an example in which α(t) changes linearly with respect to time t. FIG. 20(2) shows the relationship between α and β when transmittance α is expressed as the function α(β) of a space moving rate β. For example, α(β) indicates changes in transmittance α when the transmittance α increases linearly in the range of 20% of the moving rate β if the moving rate increases or decreases continuously in one half of the buffer area. FIG. 20(3) shows the space moving rate β in the buffer area in the case of 20(2). The space moving rate β is 0.4 at point a, 0.5 at point b, 0.2 at point c, 0.2 at point d, 0.6 at point e, 0.65 at point f, 0.5 at point g, 0.6 at point h, 0.7 at point i, and 0.5 at point j. Accordingly, the transmittance α in FIG. 20(2) is 0.0 at point a, 0.2 at point b, 0.2 at point c, 0.1 at point d, 0.1 at point e, 0.9 at point f, 0.9 at point g, 0.9 at point h, 1.0 at point i, and 1.0 at point j.

Referring to FIGS. 21 to 33, an embodiment of the system for storing real images and rendering images into display spaces that constitute a virtual space on the basis of the stored real images. An image database unit 1 according to this embodiment includes data receiving means 1040, image storing means (the data structure of the image information illustrated in FIG. 24, a hard disk 1074), area storing means (the data structure of the area information illustrated in FIG. 25, the hard disk 1074), entry storing means (pointers to images of the area information illustrated in FIG. 25, the hard disk 1074), determining means (step S115 in FIG. 27), area dividing means (step S116 in FIG. 27), and control means (the image entering process in FIG. 27). An image processing unit 11 includes data receiving means 2040, accepting means (step S202 in FIG. 29), image selecting means (step S224 in FIG. 31), control means (the main process in FIG. 29), and a display device 2022.

Figure 21:
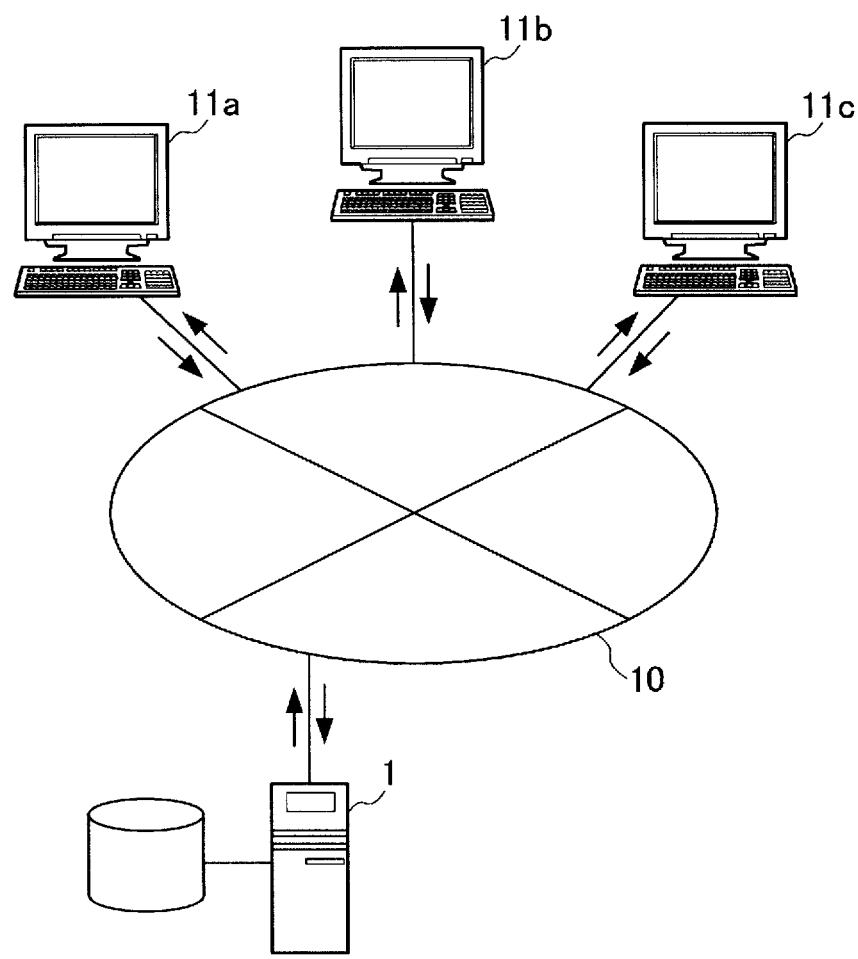
FIG. 21 is a diagram illustrating the operating environment of the image database unit.

FIG. 21 illustrates the operating environment of the image database unit 1, which shows that the image database unit 1 and image processing units 11a, 11b, and 11c are connected via a network 10 (the Internet, LAN, WAN, or the like).

The image database unit 1 stores real images sent from the image processing unit 11 via the network 10 according to the respective photographing positions added to the real images. The image processing unit 11 sends display positions to the image database unit 1 via the network 10, and receives the real images found according to the positions via the network 10 and displays them.

Figure 22:
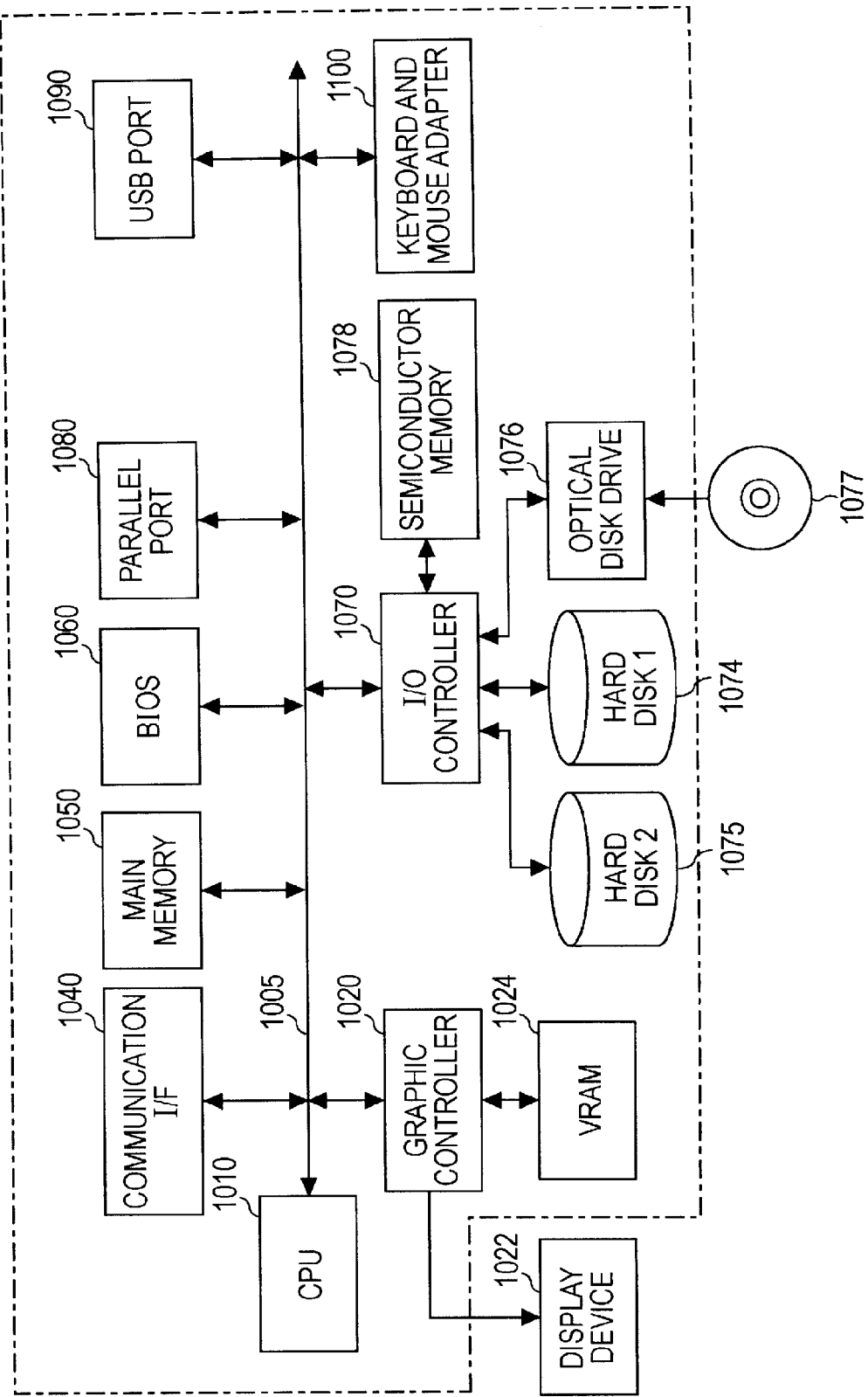
FIG. 22 is a diagram of the hardware structure of an image database unit.

FIG. 22 shows the hardware structure of the image database unit 1. While this is the general structure of an information processing unit represented by a computer, it is needless to say that a minimum structure can be selected for dedicated units or built-in units according to its environment.

The image database unit 1 includes a central processing unit (CPU) 1010, a bus line 1005, a communication I/F 1040, a main memory 1050, a basic input output system (BIOS) 1060, a parallel port 1080, a USB port 1090, a graphic controller 1020, a VRAM 1024, an I/O controller 1070, and input means such as a keyboard and mouse adapter 1100. The I/O controller 1070 can connect to storage means such as the hard disk 1074, a backup hard disk 1075, an optical disk drive 1076, and a semiconductor memory 1078. The graphic controller 1020 connects to a display device 1022.

The BIOS 1060 stores a boot program that the CPU 1010 executes to start up the image database unit 1 and programs dependent on the hardware of the image database unit 1.

Examples of the optical disk drive 1076 include a DVD-ROM drive, a CD-ROM drive, a DVD-RAM drive, and a CD-RAM drive. In this case, an optical disk 1077 corresponding to each drive must be used. The optical disk drive 1076 can also read a program or data from the optical disk 1077 and provide it to the main memory 1050 or the hard disk 1074 via the I/O controller 1070.

A computer program for the image database unit 1 is provided by the user through a recording medium such as a flexible disk 1071, the optical disk 1077, or a memory card. This computer program is read from such a recording medium via the I/O controller 1070 or downloaded via the communication I/F 1040 and installed onto the image database unit 1 for execution. Description of the operation of the information processing unit according to the computer program will be omitted here because it is the same as that of the above-described unit.

The computer program may be stored in an external storage medium. Examples of the storage medium include a magnetooptical recording medium such as an MD and a tape medium in addition to the flexible disk 1071, the optical disk 1077, and the memory card. Another example of the storage medium is a storage device such as a hard disk or an optical disk library provided for a server system connected to a private communication line or the Internet, from which a computer program may be provided to the image database unit 1 via the communication line.

Figure 23:
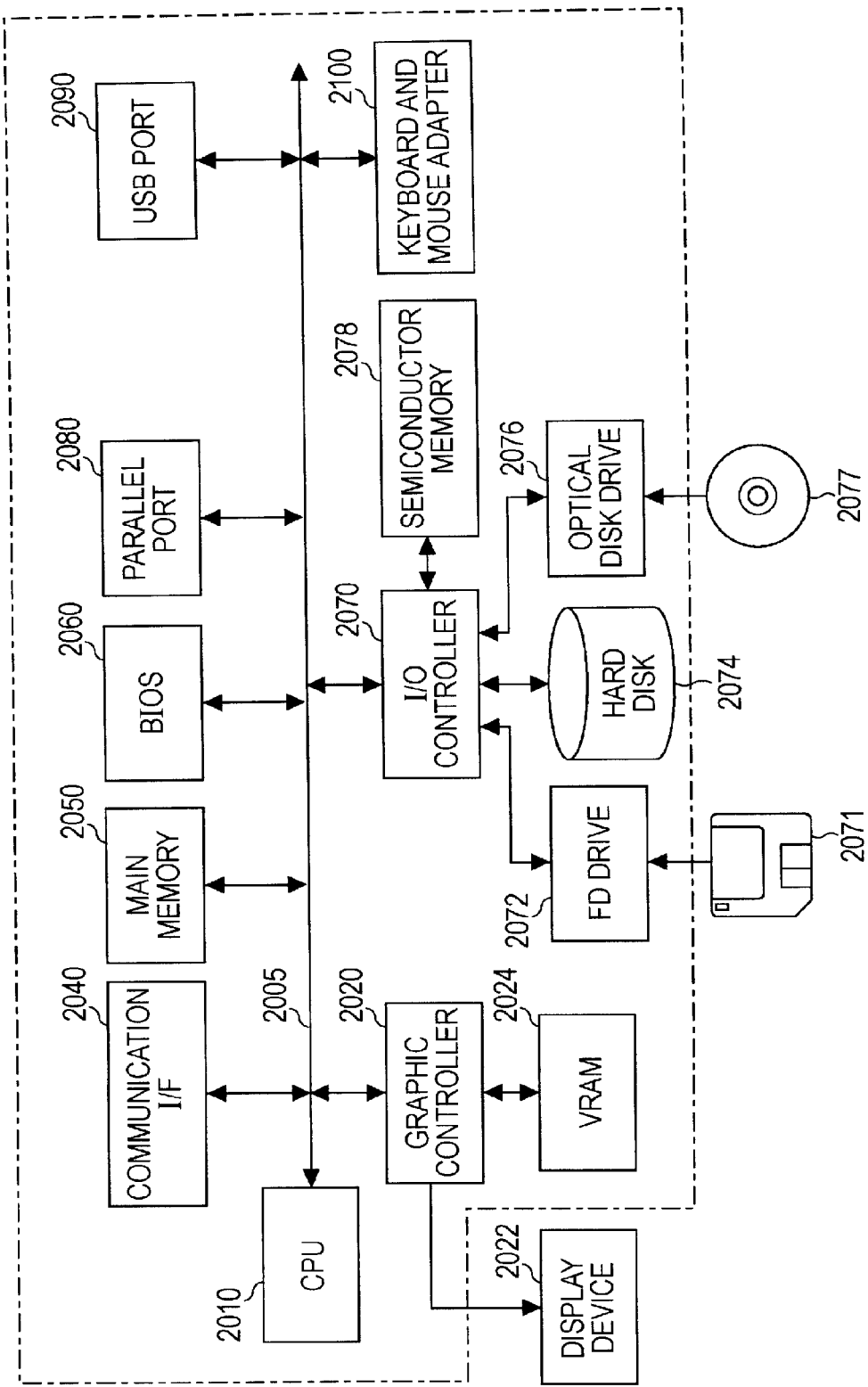
FIG. 23 is a diagram of the hardware structure of an image processing unit.

FIG. 23 shows the hardware structure of the image processing unit 11. While this is the general structure of an information processing unit represented by a computer, it is needless to say that a minimum structure can be selected for dedicated units or built-in units according to its environment.

The image processing unit 11 includes a central processing unit (CPU) 2010, a bus line 2005, a communication I/F 2040, a main memory 2050, a basic input output system (BIOS) 2060, a parallel port 2080, a USB port 2090, a graphic controller 2020, a VRAM 2024, an I/O controller 2070, and input means including a keyboard and mouse adapter 2100. The I/O controller 2070 can connect to storage means such as a flexible disk (FD) drive 2072, a hard disk 2074, an optical disk drive 2076, and a semiconductor memory 2078. The graphic controller 2020 connects to a display device 2022.

The BIOS 2060 stores a boot program that the CPU 2010 executes to start up the image processing unit 11 and programs dependent on the hardware of the image processing unit 11. The FD drive 2072 reads a program or data from a flexible disk 2071 and provides it to the main memory 2050 or the hard disk 2074 via the I/O controller 2070.

Examples of the optical disk drive 2076 include a DVD-ROM drive, a CD-ROM drive, a DVD-RAM drive, and a CD-RAM drive. In this case, an optical disk 2077 corresponding to each drive must be used. The optical disk drive 2076 can also read a program or data from the optical disk 2077 and provide it to the main memory 2050 or the hard disk 2074 via the I/O controller 2070.

A computer program for the image processing unit 11 is provided by the user through a recording medium such as the flexible disk 2071, the optical disk 2077, or a memory card. This computer program is read from such a recording medium via the I/O controller 2070 or downloaded via the communication I/F 2040 and installed onto the image processing unit 11 for execution. Description of the operation of the information processing unit according to the computer program will be omitted here because it is the same as that of the above-described unit.

The computer program may be stored in an external storage medium. Examples of the storage medium include a magnetooptical recording medium such as an MD and a tape medium in addition to the flexible disk 2071, the optical disk 2077, and the memory card. Another example of the storage medium is a storage device such as a hard disk or an optical disk library provided for a server system connected to a private communication line or the Internet, from which a computer program may be provided to the image processing unit 11 via the communication line.

Figure 24:
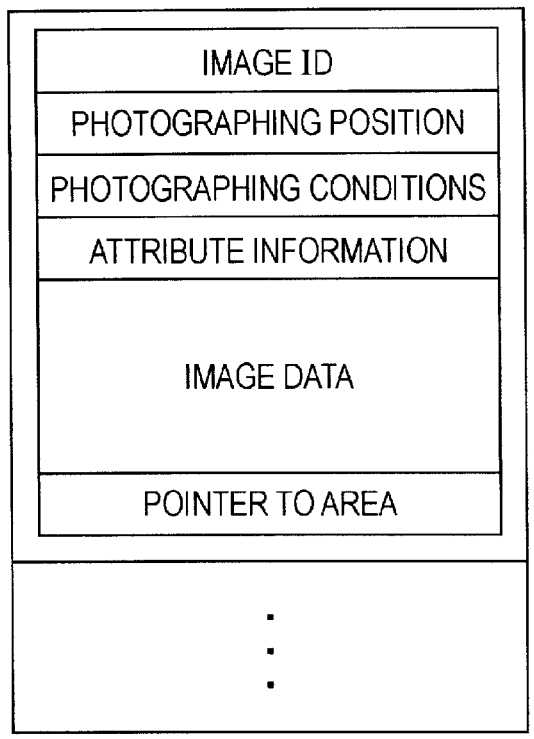
FIG. 24 is a diagram of the data structure of image information.

FIG. 24 shows the data structure of image information. The image information includes one item of image data and an image ID, photographing position data, other photographing conditions (photographing direction, elevation angle of photographing, etc.) data, attribute information (photographing date etc.), and pointers to areas.

Figure 25:
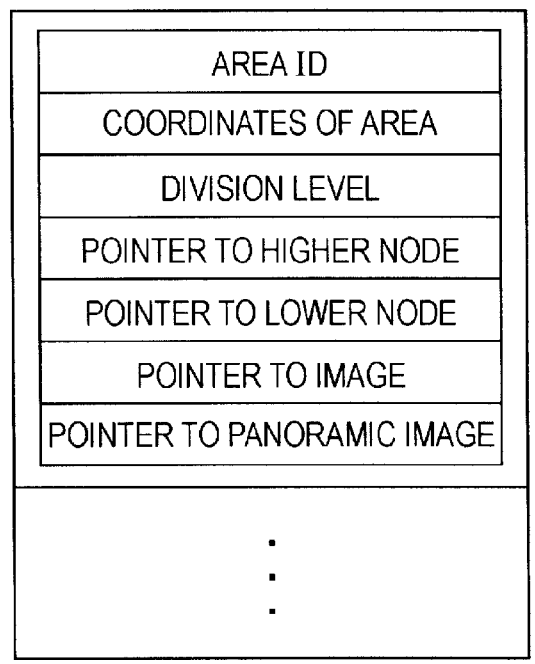
FIG. 25 is a diagram of the data structure of area information.

FIG. 25 shows the data structure of area information. One area includes an area ID, the coordinates of the area, a division level for tree structure, pointers to a higher node, a pointer to a lower node, a pointer to an image, and a pointer to a panoramic image. The division level includes the maximum number of node division levels. The pointer to an image is provided for each photographing direction, each elevation angle of photographing, and each photographing time. The real-image data is classified by photographing direction, elevation angle of photographing, and photographing time.

Figure 26:
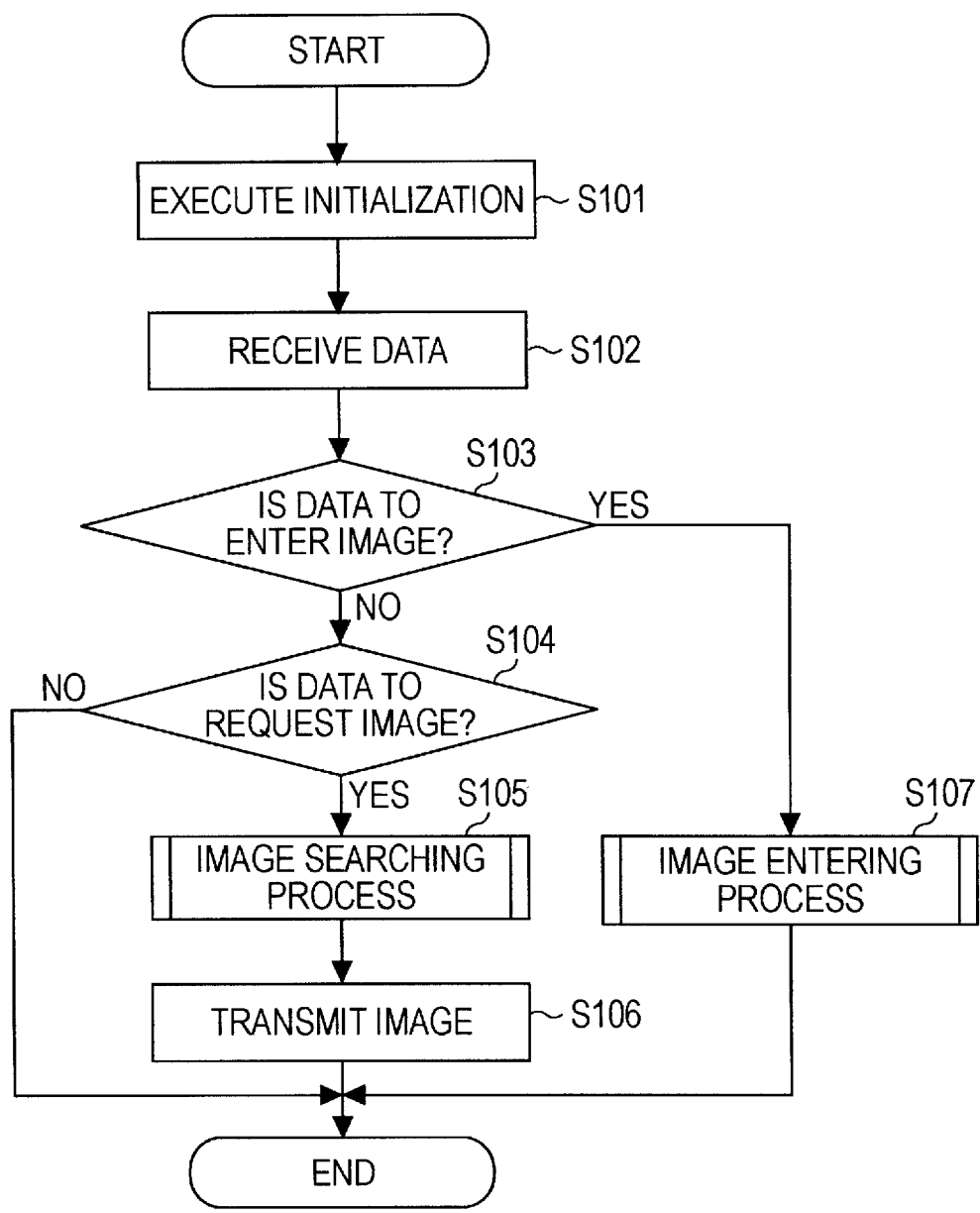
FIG. 26 is a flowchart for the main process of the image database unit.

FIG. 26 is a flowchart for the main process of the image database unit 1.

In step S101, the CPU 1010 executes initialization, and moves to step S102. In step S102, the CPU 1010 receives data from the image processing unit 11 via the network 10, and moves to step S103, wherein the CPU 1010 determines whether the received data is to enter an image. If the determination is YES, the CPU 1010 moves to step S107; if the determination is NO, the CPU 1010 moves to step S104. In step S104, the CPU 1010 determines whether the received data is to request an image, wherein if the determination is YES, the CPU 1010 moves to step S105; if the determination is NO, the CPU 1010 exits the process. In step S105, the CPU 1010 executes an image searching process on the basis of the received data, and moves to step S106, wherein the CPU 1010 transmits the image data and exits the process.

In step S107, the CPU 1010 executes an image entering process and then exits the process.

Figure 27:
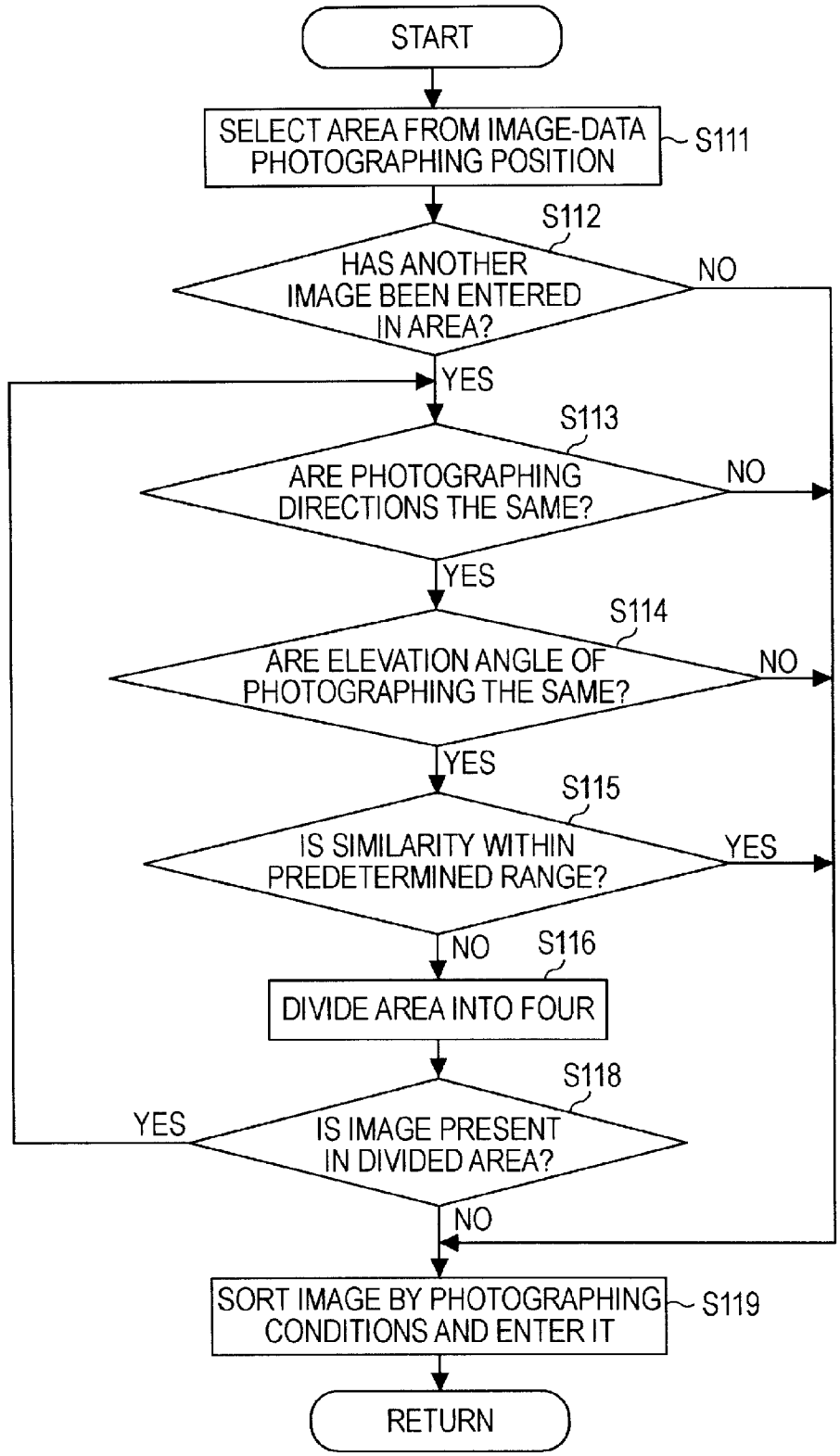
FIG. 27 is a flowchart for the image entering process of the image database unit.

FIG. 27 is a flowchart for the image entering process of the image database unit 1.

In step S111, the CPU 1010 selects an area from the photographing position of the received image data, and moves to step S112, wherein the CPU 1010 determines whether another image is stored in the selected area. If the determination is YES, the CPU 1010 moves to step S113; if it is NO, the CPU 1010 moves to step S119. In step S113, the CPU 1010 determines whether the photographing direction of the received image data is the same as that of the image data stored in the area, wherein the determination is YES, the CPU 1010 moves to step S114; if it is NO, the CPU 1010 moves to step S119. In step S114, the CPU 1010 determines whether the elevation angle of photographing of the received image data is the same as that of the image data stored in the area, wherein the determination is YES, the CPU 1010 moves to step S115; if it is NO, the CPU 1010 moves to step S119. In step S115, the CPU 1010 compares the received image data with the image data stored in the area to determine whether the similarity is within a predetermined range. If the determination is YES, the CPU 1010 moves to step S119; if it is NO, the CPU 1010 moves to step S116. In step S116, the CPU 1010 divides the area, and moves to step S118, wherein the CPU 1010 determines whether the divided areas store an image. If the determination is YES, the CPU 1010 moves to step S113; if it is NO, the CPU 1010 moves to step S119.

In step S119, the CPU 1010 enters the received image data that is classified by photographing direction, and exits the process and returns to the main process.

The comparison with the stored image in step S115 is automatic determination of the photographing direction and the similarity by the CPU 1010. As an alternative, interactive determination (the CPU 1010 requests determination and the user makes manual determination) or a semiautomatic determination (a combination of automatic and interactive determinations).

Figure 28:
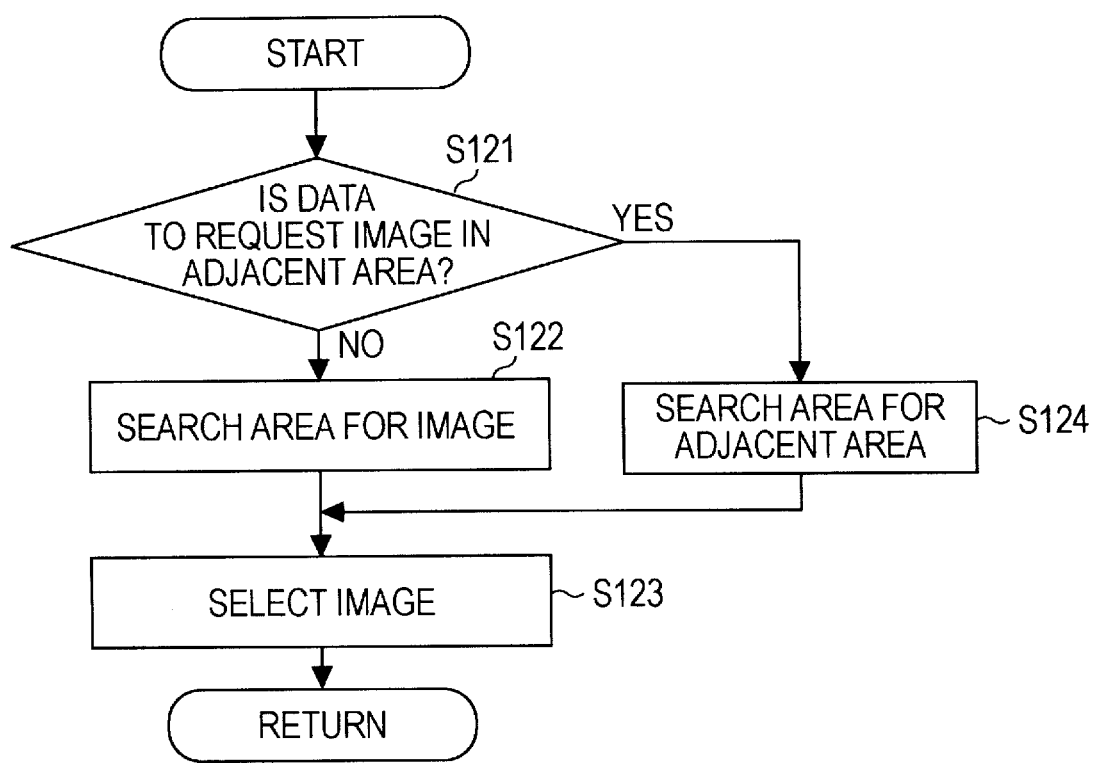
FIG. 28 is a flowchart for the image searching process of the image database unit.

FIG. 28 is a flowchart for the image searching process of the image database unit 1.

In step S121, the CPU 1010 determines whether the data is in an adjacent area. If the determination is YES, the CPU 1010 moves to step S124; if it is NO, the CPU 1010 moves to step S122. In step S122, the CPU 1010 searches the area for an image, and moves to step S123.

In step S123, the CPU 1010 selects an image, and exits the process and returns to the main process.

In step S124, the CPU 1010 searches the adjacent area for an image and moves to step S123.

Figure 29:
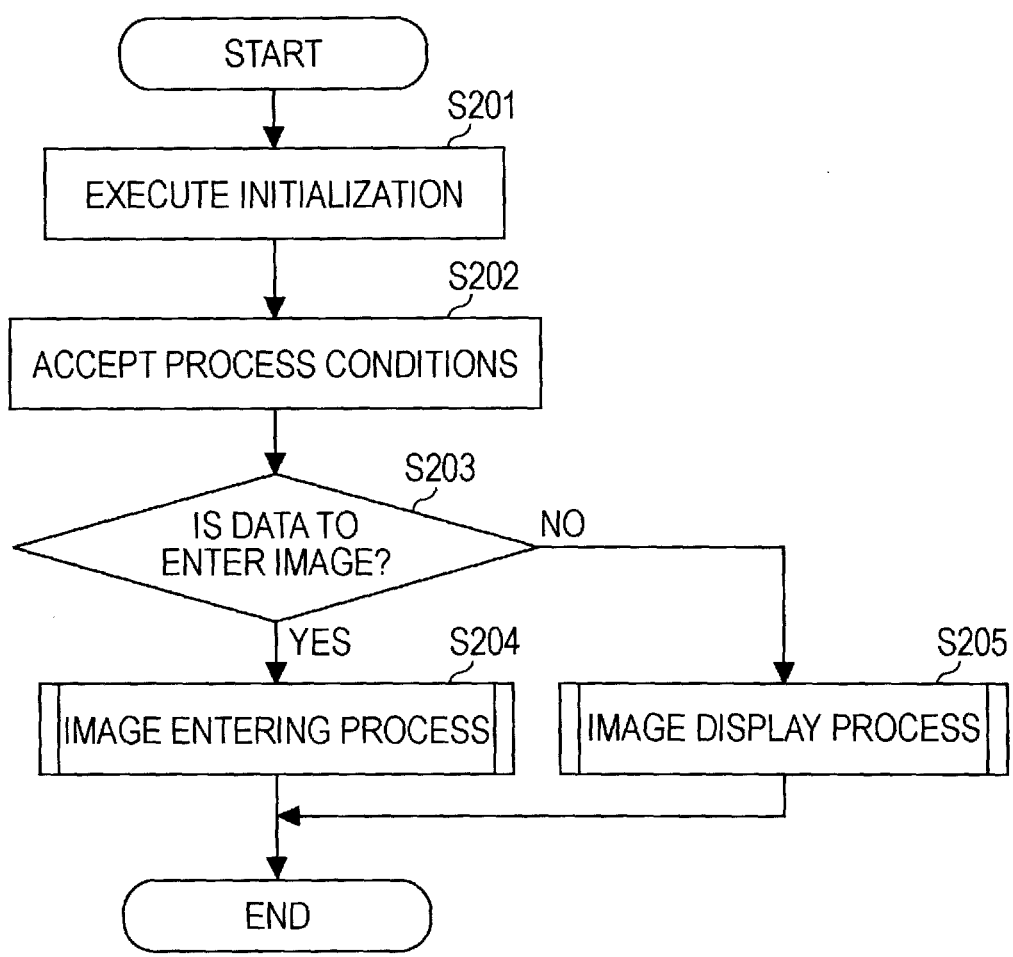
FIG. 29 is a flowchart for the main process of the image processing unit.

FIG. 29 is a flowchart for the main process of the image processing unit 11.

In step S201, the CPU 2010 executes initialization, and moves to step S202. In step S202, the CPU 2010 accepts processing conditions, and moves to step S203. In step S203, the CPU 2010 determines whether the process is to enter an image. If the determination is YES, the CPU 2010 moves to step S204; if it is NO, the CPU 2010 moves to step S205. In step S204, the CPU 2010 enters the image and then exits the process.

In step S205, the CPU 2010 displays the image and then exits the process.

Figure 30:
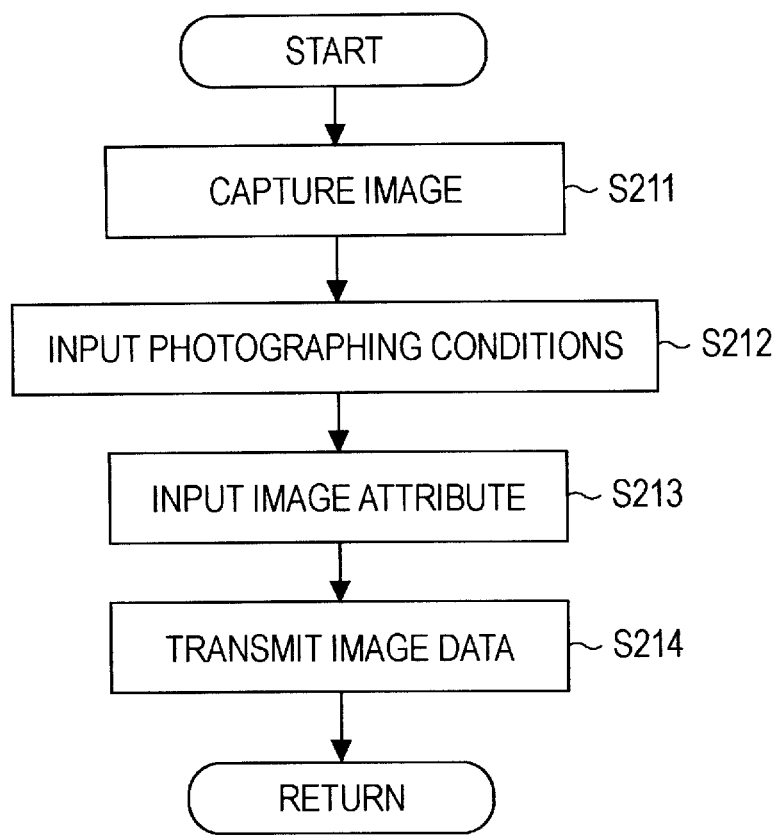
FIG. 30 is a flowchart for the image entering process of the image processing unit.

FIG. 30 is a flowchart for the image entering process of the image processing unit 11.

In step S211, the CPU 2010 captures the image, and moves to step S212. In step S211, the CPU 2010 receives the entry of photographing conditions by the user and stores them, and moves to step S213. In step S213, the CPU 2010 receives the entry of image attributes by the user, stores the image attributes input by the user, and moves to step S214. In step S214, the CPU 2010 transmits the stored information including image data, photographing conditions, and image attributes to the image database unit 1 via the Internet, and exits the process and returns to the main process.

Figure 31:
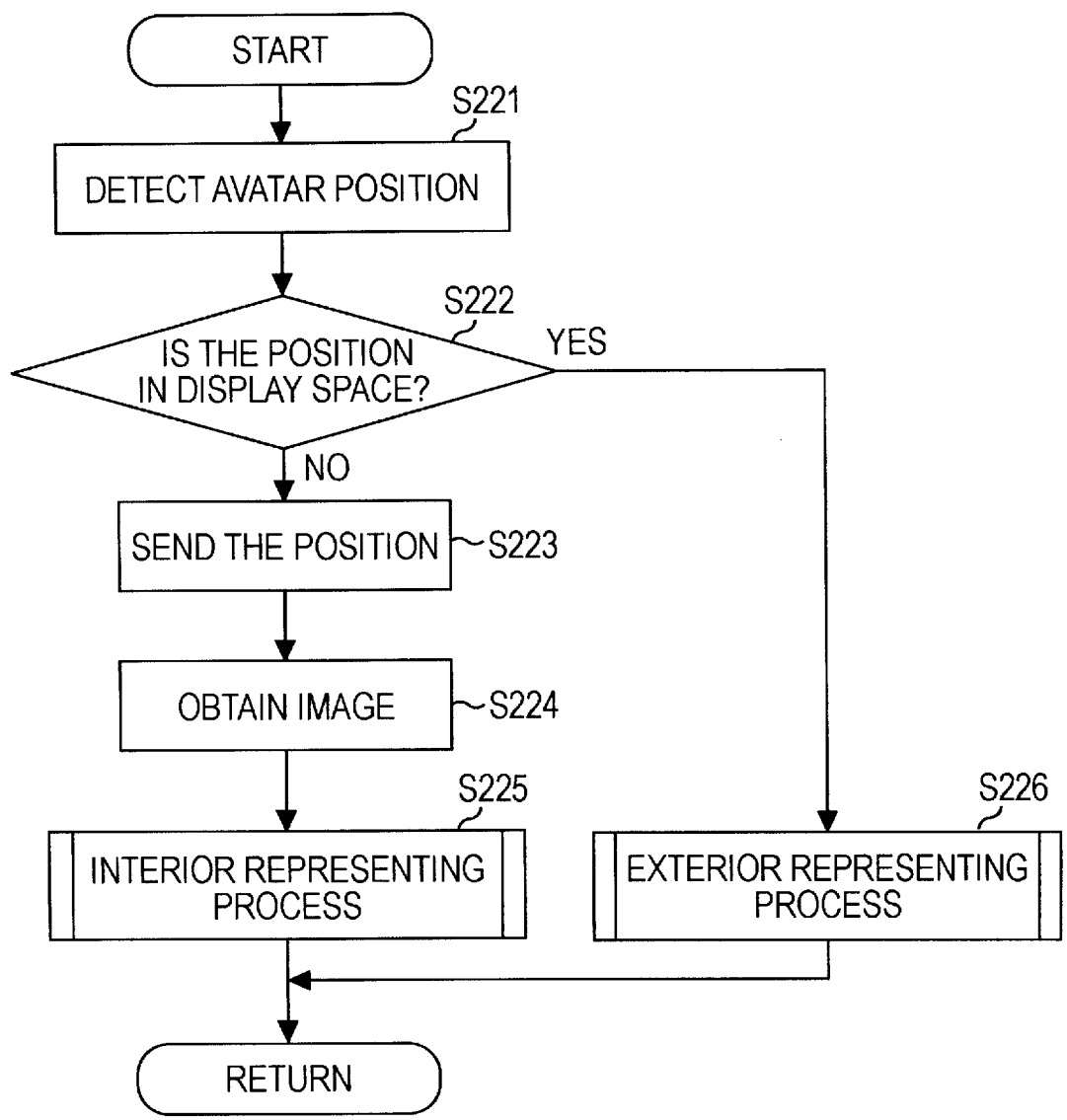
FIG. 31 is a flowchart for the image display process of the image processing unit.

FIG. 31 is a flowchart for the image display process of the image processing unit 11.

In step S211, the CPU 2010 detects the position of the avatar and moves to step S222. In step S222, the CPU 2010 determines whether the detected position is in the display space. If the determination is YES, the CPU 2010 moves to step S226; if it is NO, the CPU 2010 moves to step S223. In step S223, the CPU 2010 transmits the position data to the image database unit 1 via the network 10, and moves to step S224. In step S224, the CPU 2010 obtains image data sent from the image database unit 1 via the network 10, and moves to Step S225. In step S225, the CPU 2010 executes a display space interior representing process, and exits the process and returns to the main process.

In step S226, the CPU 2010 executes a display space exterior representing process, and exits the process and returns to the main process.

Figure 32:
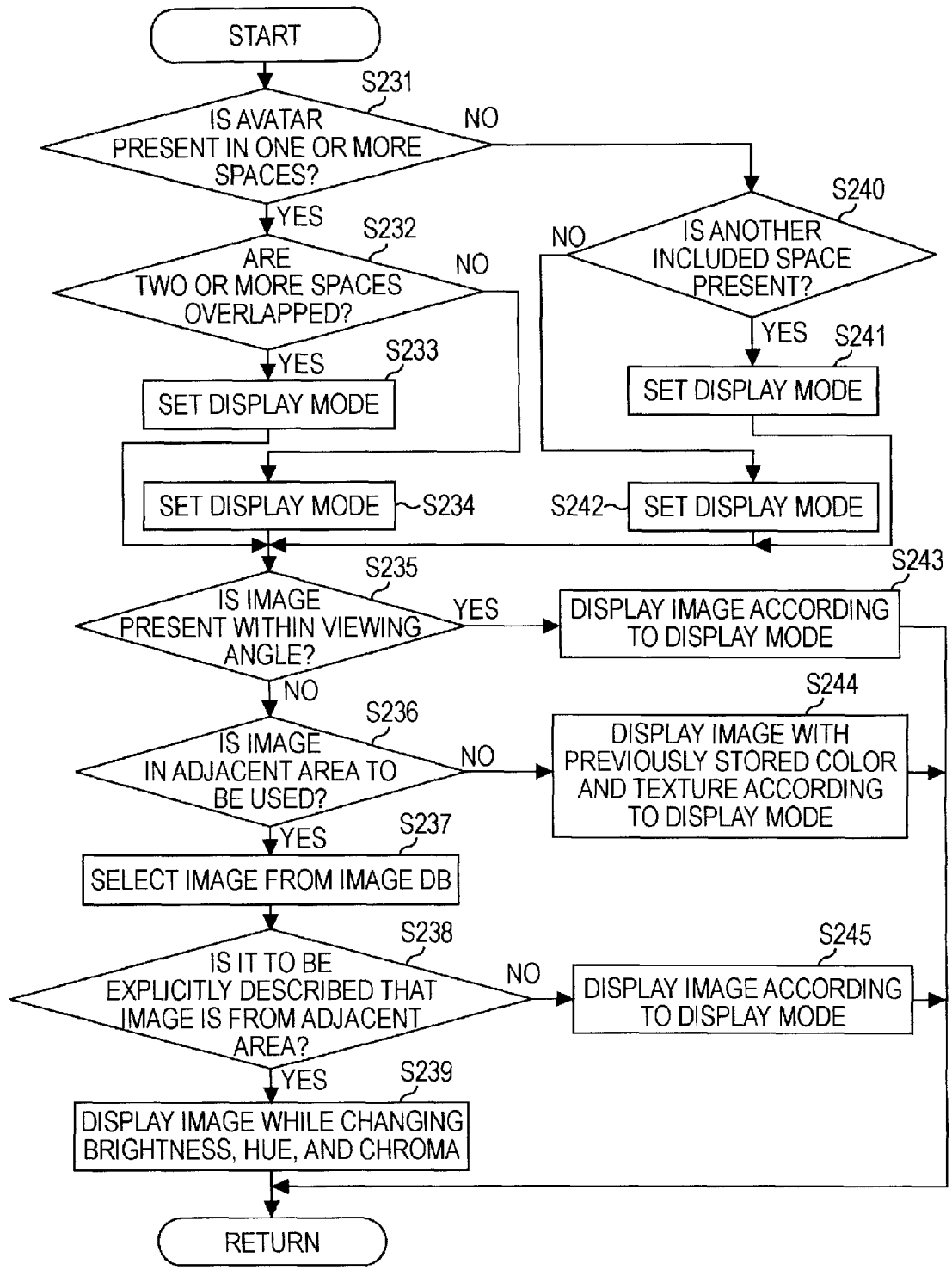
FIG. 32 is a flowchart for the process of representing the interior of the display space by the image processing unit.

FIG. 32 is a flowchart for the process of representing the interior of the display space by the image processing unit 11.

In step S231, the CPU 2010 determines whether an avatar is present in one or more spaces. If the determination is YES, the CPU 2010 moves to step S232; if it is NO, the CPU 2010 moves to step S240. In step S232, the CPU 2010 determines whether two or more spaces overlap. If the determination is YES, the CPU 2010 moves to step S233; if it is NO, the CPU 2010 moves to step S234. In step S233, the CPU 2010 sets a display mode, and moves to step S255.

In step S234, the CPU 2010 sets a display mode and moves to step S235.

In step S235, the CPU 2010 determines whether an image is present within a viewing angle. If the determination is YES, the CPU 2010 moves to step S243; if it is No, the CPU 2010 moves to step S236. In step S236, the CPU 2010 determines whether to use an image in an adjacent area. If the determination is YES, the CPU 2010 moves to step S237; if it is NO, the CPU 2010 moves to step S244. In step S237, the CPU 2010 selects an image in an adjacent area from the image database unit 1 via the network 10, and moves to step S238. In step S238, the CPU 2010 determines whether to explicitly describe that the image is from an adjacent area. If the determination is YES, the CPU 2010 moves to step S239; if it is NO, the CPU 2010 moves to step S245. In step S239, the CPU 2010 displays the image while changing the brightness, hue, and chroma thereof according to the display mode, and exits the process and returns to the image display process.

In step S240, the CPU 2010 determines whether the display space includes another space. If the determination is YES, the CPU 2010 moves to step S241; if it is NO, the process moves to step S242. In step S241, the CPU 2010 sets a display mode, and moves to step S235.

In step S242, the CPU 2010 sets a display mode, and moves to step S235.

In step S243, the CPU 2010 displays an image according to the display mode, and exits the process and returns to the image display process.

In step S244, the CPU 2010 displays an image with a previously stored color and texture according to the display mode, and exits the process and returns to the image display process.

In step S245, the CPU 2010 displays an image according to the display mode, and exits the process and returns to the image display process.

Figure 33:
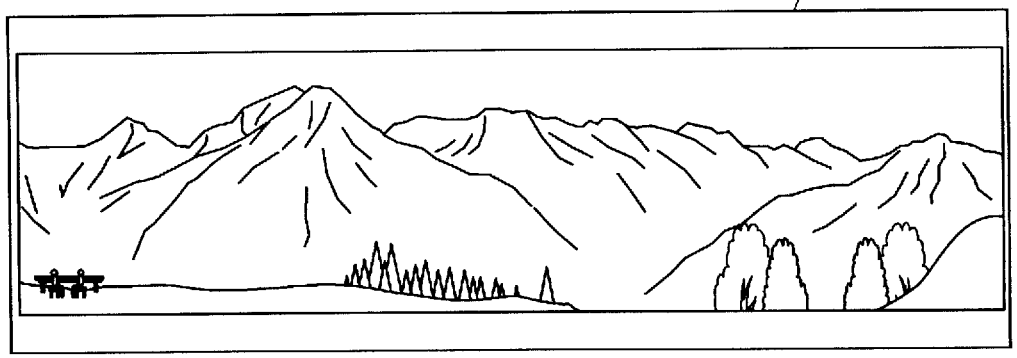
FIG. 33 is a diagram of an example of a panoramic image in a display space.

FIG. 33 is a diagram of an example of the panoramic image in a display space of the image processing unit 11, in which real-image data received via the Internet is subjected to rendering in the display space according to the position of the avatar and displayed on the display device 2022. The image is displayed using a multiplex display technique such as scrolling and overlapping of a real image in the viewing direction associated with an area including the viewing position and a real image corresponding to the viewing direction associated with the area adjacent to the area including the viewing position.

FIG. 34 shows examples of searching an adjacent area by the method of labeling the areas by binary notation, as described with reference to FIG. 6. A normalized space whose lower left end is (0, 0) and upper right end is (1, 1) is recursively divided into four areas. For example, when the four-area division is repeated evenly three times (n=3), the space is divided into $2^3 \times 2^3 = 64$ areas. The labels of the lower left and the upper right ends of the area becomes $(0(\frac{1}{2})^3, 0(\frac{1}{2})^3) = (000, 000)$ and $(7(\frac{1}{2})^3, (7(\frac{1}{2})^3) = (111, 111)$, respectively. The numerals in FIG. 34 indicate the respective labels of the areas. For example, an area adjacent to an area $(3(\frac{1}{2})^3, 5(\frac{1}{2})^3) = (011, 101)$ is determined, where the degree n of division=3, positions k=3 and j=5. Area (011, 101) corresponds to area ID S-132.

Referring to FIG. 34(1), the areas adjacent to area (011, 101), if divided evenly, are expressed as the areas with the following labels according to the expression described with reference to FIG. 6.

A northern adjacent area is expressed as $(3(\frac{1}{2})^3, (5+1)(\frac{1}{2})^3) = (011, 110)$.

A northeast adjacent area is expressed as $((3+1)(\frac{1}{2})^3, (5+1)(\frac{1}{2})^3) = (100, 110)$.

An eastern adjacent area is expressed as $((3+1)(\frac{1}{2})^3, 5(\frac{1}{2})^3) = (100, 101)$.

A southeast adjacent area is expressed as $((3+1)(\frac{1}{2})^3, (5-1)(\frac{1}{2})^3) = (100, 100)$.

A southern adjacent area is expressed as $(3(\frac{1}{2})^3, (5-1)(\frac{1}{2})^3) = (011, 100)$.

A southwest adjacent area is expressed as $((3-1)(\frac{1}{2})^3, (5-1)(\frac{1}{2})^3) = (010, 100)$.

A western adjacent area is expressed as $((3-1)(\frac{1}{2})^3, 5(\frac{1}{2})^3) = (010, 101)$.

A northwest adjacent area is expressed as $((3-1)(\frac{1}{2})^3, (5+1)(\frac{1}{2})^3) = (010, 110)$.

Referring to FIG. 34(2), the areas adjacent to area (011, 101), if divided unevenly (divided roughly), are expressed as the areas with the following labels.

When the degree m of division=2, a northern adjacent area is expressed as $(int(\frac{3}{2}^{3-2})(\frac{1}{2})^2, int((5+1)/2^{3-2})(\frac{1}{2})^2) = (int(\frac{3}{2}^{3-2})(\frac{1}{2})^2, int((5+1)/2^{3-2})(\frac{1}{2})^2) = (1(\frac{1}{2})^2, 3(\frac{1}{2})^2) = (01, 11)$.

When the degree m of division=2, a northeast adjacent area is expressed as $(int((3+1)/2^{3-2})(\frac{1}{2})^2, int((5+1)/2^{3-2})(\frac{1}{2})^2) = (2(\frac{1}{2})^2, 3(\frac{1}{2})^2) = (10, 11)$.

When the degree m of division=2, an eastern adjacent area is expressed as $(int((3+1)/2^{3-2})(\frac{1}{2})^2, int(\frac{5}{2}^{3-2})(\frac{1}{2})^2) = (2(\frac{1}{2})^2, 2(\frac{1}{2})^2) = (10, 10)$.

When the degree m of division=2, a southeast adjacent area is expressed as $(int((3+1)/2^{3-2})(\frac{1}{2})^2, int((5-1)/2^{3-2})(\frac{1}{2})^2) = (2(\frac{1}{2})^2, 2(\frac{1}{2})^2) = (10, 10)$.

When the degree m of division=3, a southern adjacent area is expressed as $(int(\frac{3}{2}^{3-3})(\frac{1}{2})^3, int((5-1)/2^{3-3})(\frac{1}{2})^3) = (3(\frac{1}{2})^3, 4(\frac{1}{2})^3) = (011, 100)$.

When the degree m of division=3, a southwest adjacent area is expressed as $(int((3-1)/2^{3-3})(\frac{1}{2})^3, int((5-1)/2^{3-3})(\frac{1}{2})^3) = (2(\frac{1}{2})^3, 4(\frac{1}{2})^3) = (010, 100)$.

When the degree m of division=3, a western adjacent area is expressed as $(int((3-1)/2^{3-3})(\frac{1}{2})^3, int(\frac{5}{2}^{3-3})(\frac{1}{2})^3) = (2(\frac{1}{2})^3, 5(\frac{1}{2})^3) = (010, 101)$.

When the degree m of division=2, a northwest adjacent area is expressed as $(int((3-1)/2^{3-2})(\frac{1}{2})^2, int((5+1)/2^{3-2})(\frac{1}{2})^2) = (1(\frac{1}{2})^2, 3(\frac{1}{2})^2) = (01, 11)$.

Referring to FIG. 35(3), the areas adjacent to area (011, 101), if divided unevenly (divided finely), are expressed as the areas with the following labels.

When the degree m of division=4, s is expressed as $0 \leq s < 2^{4-3}$, that is, 0 and 1. Therefore north adjacent areas are the following two areas expressed as: $((3 \times 2^{4-3}+0)(\frac{1}{2})^4, ((5+1) \times 2^{4-3})(\frac{1}{2})^4) = (6(\frac{1}{2})^4, 12(\frac{1}{2})^4) = (0110, 1100)$ and $((3 \times 2^{4-3}+1)(\frac{1}{2})^4, ((5+1) \times 2^{4-3})(\frac{1}{2})^4) = (7(\frac{1}{2})^4, 12(\frac{1}{2})^4) = (0111, 1100)$.

When the degree m of division=4, a northeast adjacent area is expressed as $((3+1) \times 2^{4-3})(\frac{1}{2})^4, ((5+1) \times 2^{4-3})(\frac{1}{2})^4) = (8(\frac{1}{2})^4, 12(\frac{1}{2})^4) = (1000, 1100)$.

When the degree m of division=4, s is expressed as $0 \leq s < 2$ that is, 0 and 1. Therefore eastern adjacent areas are the following two areas expressed as: $((3+1) \times 2^{4-3})(\frac{1}{2})^4, (5 \times 2^{4-3}+0)(\frac{1}{2})^4) = (8(\frac{1}{2})^4, 10(\frac{1}{2})^4) = (1000, 1010)$ and $((3+1) \times 2^{4-3})(\frac{1}{2})^4, (5 \times 2^{4-3}+1)(\frac{1}{2})^4) = (8(\frac{1}{2})^4, 11(\frac{1}{2})^4) = (1000, 1011)$.

When the degree m of division=4, a southeast adjacent area is expressed as $((3+1) \times 2^{4-3})(\frac{1}{2})^4, (5 \times 2^{4-3}-1)(\frac{1}{2})^4) = (8(\frac{1}{2})^4, 9^4) = (1000, 1001)$.

When the degree m of division=4, s is expressed as $0 \leq s < 2$ that is, 0 and 1. Therefore, southern adjacent areas are the following two areas expressed as: $((3 \times 2^{4-3}+0)(\frac{1}{2})^4, (5 \times 2^{4-3}-1)(\frac{1}{2})^4) = (6(\frac{1}{2})^4, 9(\frac{1}{2})^4) = (0110, 1001)$ and $((3 \times 2^{4-3}+1)(\frac{1}{2})^4, (5 \times 2^{4-3}-1)(\frac{1}{2})^4) = (7(\frac{1}{2})^4, 9(\frac{1}{2})^4) = (0111, 1001)$.

When the degree m of division=4, a southwest adjacent area is expressed as $((3 \times 2^{4-3}-1)(\frac{1}{2})^4, (5 \times 2^{4-3}+1)(\frac{1}{2})^4) = (5(\frac{1}{2})^4, 9(\frac{1}{2})^4) = (0101, 1001)$.

When the degree m of division=4, s is expressed as $0 \leq s < 2$ that is, 0 and 1. Therefore, western adjacent areas are the following two areas expressed as: $((3 \times 2^{4-3}-1)(\frac{1}{2})^4, (5 \times 2^{4-3}+0)(\frac{1}{2})^4) = (5(\frac{1}{2})^4, 10(\frac{1}{2})^4) = (0101, 1010)$ and $((3 \times 2^{4-3}-1)(\frac{1}{2})^4, (5 \times 2^{4-3}+1)(\frac{1}{2})) = (5(\frac{1}{2})^4, 11(\frac{1}{2})^4) = (0101, 1011)$.

When the degree m of division=4, a northwest adjacent area is expressed as $((3 \times 2^{4-3}-1)(\frac{1}{2})^4, ((5+1) \times 2^{4-3})(\frac{1}{2})^4) = (5(\frac{1}{2})^4, 12(\frac{1}{2})^4) = (0101, 1100)$.

The image processing unit 11 according to the invention obtains image information associated with an area in a virtual space including the viewing position 511 designated using a coordinate system from the image database unit 1 via the network 10 on the basis of the coordinates of the viewing position 511, renders an image according to the display space 501, 502, 503, or 504 for visualizing the area according to the conditions received by the accepting means (step S202 in FIG. 29), and displays it on the display device 2022. The image database unit 1 stores images photographed by a plurality of users and image information including their photographing positions designated by common coordinates used among the users, photographing conditions, and attributes of the photographed images (see FIG. 24), and stores areas in a virtual space having the range designated by the coordinates and image information including the photographing positions included in the areas in association with each other (see FIG. 25).

While the invention has been described in its preferred embodiments, it is to be understood that the invention is not limited to the embodiments. Rather, various changes in form and details may be made without departing from the spirit and scope of the invention as set forth in the claims.

The invention claimed is:

1. An image processing unit for processing images comprising:
    a data receiving unit for receiving data over a network;
    an image acquisition unit for obtaining image information from an image database using the data receiving unit, the image database storing image information stored by a plurality of users, and associated information representing corresponding areas of a three-dimensional virtual space each having a range designated using a latitude and longitude coordinate system commonly used by the users;
    a control unit for obtaining the image information associated with the areas of the three-dimensional virtual space, each area including a viewing position designated by the coordinates using the image acquisition unit, generating a plurality of three-dimensional display spaces in the three-dimensional virtual space, and rendering images using the obtained image information according to display conditions of three-dimensional display spaces for visualizing the three-dimensional areas; and
    a display unit for displaying the images rendered in a respective three-dimensional display space according to display conditions, the images rendered changed from a first plurality of images to a second plurality of images in response to transitioning from a first three-dimensional display space to a second three-dimensional display space different from the first three-dimensional display space.

2. The image processing unit according to claim 1, further comprising:
    an accepting unit for accepting image processing conditions;
    wherein the control means renders images using the image information obtained by the image acquisition means according to the conditions accepted by the accepting means.

3. The display unit according to claim 1 wherein:
    the image information includes images photographed by the users, photographing positions of the images designated by the coordinates, photographing conditions, and attributes of the photographed images; and
    the image database stores the information representing the areas of the virtual space and the image information having the photographing positions included in the areas in association with each other.

4. The image processing unit according to claim 2, wherein when the image information associated with the areas each including the viewing position cannot be obtained by the image acquisition unit, the control unit obtains the image information associated with the area adjacent to the area including the viewing position using the image acquisition unit, and interpolates the image information according to the obtained image information to render images.

5. The image processing unit according to claim 4, wherein the photographing conditions include a photographing distance; and
    the control unit obtains first image information associated with the areas each including the viewing position using the image acquisition unit, obtains second image information associated with the area adjacent to the area including the viewing position using the image acquisition unit, and renders an image according to the photographing distance included in the first image information and the second image information.

6. The image processing unit according to claim 5, wherein the photographing conditions include a photographing time; and
    the control unit renders images using, out of the image information associated with the areas each including the viewing position, the image information having the photographing time matching the photographing time accepted by the accepting unit.

7. A method for processing images, the method comprising the steps of:
    receiving data over a network;
    acquiring image information from an image database, the image database storing the image information stored by a plurality of users, and associated information representing corresponding areas of a three-dimensional virtual space each having a range designated using a latitude and longitude coordinate system commonly used by the users;

obtaining the image information associated with the areas of the three-dimensional virtual space, each area including a viewing position designated by coordinates;

generating a plurality of three-dimensional display spaces in the three-dimensional virtual space;

rendering images using the obtained image information according to display conditions of three-dimensional display spaces for visualizing the three-dimensional areas;

displaying the images rendered in a respective three-dimensional display space according to display conditions; and changing the images rendered from a first plurality of images to a second plurality of images in response to transitioning from a first three-dimensional display space to a second three-dimensional display space different from the first three-dimensional display space.

8. The method for processing images according to claim 7, further comprising:

accepting image processing conditions;

wherein the images are rendered using the image information obtained according to the conditions accepted.

9. The method for displaying the images according to claim 7 wherein:

the image information includes images photographed by the users, photographing positions of the images designated by the coordinates, photographing conditions, and attributes of the photographed images; and the image database stores the information representing the areas of the virtual space and the image information having the photographing positions included in the areas in association with each other.

10. The method for processing images according to claim 8, wherein:

when the image information associated with the areas each including the viewing position cannot be obtained by the image acquisition unit, the control unit obtains the image information associated with the area adjacent to the area including the viewing position in the image acquisition step, and interpolates the image information according to the obtained image information to render images.

11. The method for processing images according to claim 10, wherein:

the photographing conditions include a photographing distance; and the control unit obtains first image information associated with the areas each including the viewing position in the image acquisition step, obtains second image information associated with the area adjacent to the area including the viewing position in the image acquisition step, and renders an image according to the photographing distance included in the first image information and the second image information.

12. The method for processing images according to claim 11, wherein:

the photographing conditions include a photographing time; and the control unit renders images using, out of the image information associated with the areas each including the viewing position, the image information having the photographing time matching the photographing time accepted in the accepting unit.

13. A non-transitory computer program product having a computer usable program code configured for causing a computer to process images by performing the steps of: receiving data over a network; acquiring image information from an image database, the image database storing the image information stored by a plurality of users, and associated information representing corresponding areas of a three-dimensional virtual space each having a range designated using a latitude and longitude coordinate system commonly used by the users; obtaining the image information associated with the areas of the three-dimensional virtual space, each area including a viewing position designated by coordinates; generating a plurality of three-dimensional display spaces in the three-dimensional virtual space, rendering images using the obtained image information according to display conditions of three-dimensional display spaces for visualizing the three-dimensional areas; displaying the images rendered in a respective three-dimensional display space according to display conditions; and changing the images rendered from a first plurality of images to a second plurality of images in response to transitioning from a first three-dimensional display space to a second three-dimensional display space different from the first three-dimensional display space.

14. The non-transitory computer program product according to claim 13, further comprising: accepting image processing conditions; wherein the images are rendered using the image information obtained according to the conditions accepted.

15. The non-transitory computer program product according to claim 13 wherein: the image information includes images photographed by the users, photographing positions of the images designated by the coordinates, photographing conditions, and attributes of the photographed images; and the image database stores the information representing the areas of the virtual space and the image information having the photographing positions included in the areas in association with each other.

16. The non-transitory computer program product according to claim 14, wherein: when the image information associated with the areas each including the viewing position cannot be obtained by the image acquisition unit, the control unit obtains the image information associated with the area adjacent to the area including the viewing position in the image acquisition step, and interpolates the image information according to the obtained image information to render images.

17. The non-transitory computer program product according to claim 16, wherein: the photographing conditions include a photographing distance; and the control unit obtains first image information associated with the areas each including the viewing position in the image acquisition step, obtains second image information associated with the area adjacent to the area including the viewing position in the image acquisition step, and renders an image according to the photographing distance included in the first image information and the second image information.

18. The non-transitory computer program product according to claim 17, wherein: the photographing conditions include a photographing time; and the control unit renders images using, out of the image information associated with the areas each including the viewing position, the image information having the photographing time matching the photographing time accepted in the accepting unit.

* * * * *